(12) United States Patent
Wang et al.

(10) Patent No.: US 11,882,075 B2
(45) Date of Patent: Jan. 23, 2024

(54) INFORMATION FEEDBACK METHOD AND APPARATUS, INFORMATION RECEIVING METHOD AND APPARATUS, DEVICE, AND STORAGE MEDIUM

(71) Applicant: ZTE Corporation, Guangdong (CN)

(72) Inventors: Xiyu Wang, Guangdong (CN); Zhaohua Lu, Guangdong (CN); Bo Gao, Guangdong (CN); Liujun Hu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/078,711

(22) Filed: Dec. 9, 2022

(65) Prior Publication Data

US 2023/0116788 A1 Apr. 13, 2023

Related U.S. Application Data

(63) Continuation of application No. PCT/CN2021/106064, filed on Jul. 13, 2021.

(30) Foreign Application Priority Data

Oct. 10, 2020 (CN) .......................... 202011078401.0

(51) Int. Cl.
*H04W 24/10* (2009.01)
*H04L 5/00* (2006.01)

(52) U.S. Cl.
CPC ........... *H04L 5/0057* (2013.01); *H04W 24/10* (2013.01)

(58) Field of Classification Search
CPC .... H04L 5/0057; H04L 5/0048; H04W 24/10; H04W 28/06
See application file for complete search history.

(56) References Cited

U.S. PATENT DOCUMENTS 10,609,611 B2 3/2020 Park et al.
10,812,239 B2 10/2020 Gao et al.
(Continued)

FOREIGN PATENT DOCUMENTS

CN 108111278 A 6/2018
CN 108208991 A 6/2018
(Continued)

OTHER PUBLICATIONS

International Search Report in International Application No. PCT/CN2021/106064, dated Sep. 28, 2021, 6 pages.
(Continued)

*Primary Examiner* — Chuong A Ngo
(74) *Attorney, Agent, or Firm* — Perkins Coie LLP

(57) ABSTRACT

Provided are an information feedback method and apparatus, an information receiving method and apparatus, a device, and a storage medium. The information feedback includes the following: a second node configures a report configuration and sends the report configuration to a first node; the first node receives the report configuration sent by the second node and determines channel state information according to the report configuration, where the channel state information includes a reference signal, and the reference signal satisfies a grouping criterion associated with the report configuration; the channel state information is fed back to the second node through a report instance; and the second node receives the channel state information fed back by the first node through the report instance.

19 Claims, 6 Drawing Sheets

(56) References Cited

U.S. PATENT DOCUMENTS

| | | | |
|---|---|---|---|
| 11,368,950 | B2 | 6/2022 | Liou |
| 11,496,204 | B2 | 11/2022 | Guan et al. |
| 2018/0115357 | A1 | 4/2018 | Park et al. |
| 2018/0323845 | A1 | 11/2018 | Chang et al. |
| 2018/0368142 | A1 | 12/2018 | Liou |
| 2020/0014455 | A1 | 1/2020 | Gao et al. |
| 2020/0196161 | A1 | 6/2020 | Ahn et al. |
| 2020/0204239 | A1 | 6/2020 | Kang et al. |
| 2021/0143957 | A1 | 5/2021 | Gao et al. |
| 2021/0250735 | A1 | 8/2021 | Hao et al. |
| 2021/0314784 | A1 | 10/2021 | Gao et al. |
| 2022/0006582 | A1* | 1/2022 | Yamada ................ H04W 16/28 |
| 2022/0149915 | A1* | 5/2022 | Mittal ..................... H04L 1/003 |

FOREIGN PATENT DOCUMENTS

| | | | |
|---|---|---|---|
| CN | 109152011 | A | 1/2019 |
| CN | 109152054 | A | 1/2019 |
| CN | 110475355 | A | 11/2019 |
| CN | 110740510 | A | 1/2020 |
| CN | 111148126 | A | 5/2020 |
| CN | 112243261 | A | 1/2021 |
| EP | 3512150 | A1 | 7/2019 |
| WO | 2018202197 | A1 | 11/2018 |
| WO | 2020029956 | A1 | 2/2020 |

OTHER PUBLICATIONS

Qualcomm Incorporated, "Enhancements on beam management for multi-TRP," 3GPP TSG RAN WG1 Meeting #102-e, R1-2006793, Aug. 17-28, 2020, 4 pages.
Australian notice of acceptance issued in AU Patent Application No. 2021356421, dated May 2, 2023, 3 pages.
Korean office action issued in KR Patent Application No. 10-2023-7009086, dated Aug. 21, 2023. English translation included.
Chinese office action issued in CN Patent Application No. 202011078401.0, dated May 22, 2021. English translation included.
Chinese allowance issued in CN Patent Application No. 202011078401.0, dated Sep. 14, 2021. English translation included.
Samsung, "On Beam Management, Measurement and Reporting," 3GPP TSG RAN WG1 NR AH#3, R1-1715940, Nagoya, Japan, Sep. 18-21, 2017, 16 pages.
Japanese notice of allowance issued in JP Patent Application No. 2023-517281, dated Sep. 28, 2023, 4 pages. English translation included.
Moderator (CATT), "Summary on email discussion on beam management for simultaneous multi-TRP transmission with multiple Rx panels," 3GPP TSG RAN WG1 Meeting #102-e, R1-2007294, e-Meeting, Aug. 17-28, 2020, 21 pages.
ZTE, "Enhancements on beam management for multi-TRP," 3GPP TSG RAN WG1 Meeting #102-e, R1-2005457, e-Meeting, Aug. 17-28, 2020, 11 pages.
Korean notice of allowance issued in KR Patent Application No. 10-2023-7009086, dated Dec. 4, 2023, 8 pages. English translation included.
ZTE, "Preliminary views on further enhancement for NR MIMO," 3GPP TSG RAN WG1 Meeting #101-e, R1-2003483, e-Meeting, May 25-Jun. 5, 2020, 18 pages.
CATT, "Summary on email discussion on beam management for simultaneous multi-TRP transmission with multiple Rx panels," 3GPP TSG RAN WG1 Meeting #102-e, R1-2007294, e-Meeting, Aug. 17-28, 2020, 21 pages.
European Search Report issued in EP Patent Application No. 21876891.9, dated Nov. 30, 2023, 23 pages.

* cited by examiner

INFORMATION FEEDBACK METHOD AND APPARATUS, INFORMATION RECEIVING METHOD AND APPARATUS, DEVICE, AND STORAGE MEDIUM

CROSS-REFERENCE TO RELATED APPLICATIONS

This application is a continuation of International Patent Application No. PCT/CN2021/106064, filed Jul. 13, 2021, which claims priority to CN patent application No. 202011078401.0, filed with the Chinese Patent Office on Oct. 10, 2020, the disclosures of which are incorporated herein by reference in their entireties.

TECHNICAL FIELD

The present application relates to the field of communication technologies, for example, an information feedback method and apparatus, an information receiving method and apparatus, a device, and a storage medium.

BACKGROUND

In a 5th generation mobile communication technology (5G) communication system, a group based report is also referred to as a group based beam report, and multiple reference signals in the group based report can be received simultaneously, so as to achieve the capability of multiple beams operating simultaneously under multiple antenna panels and multiple transmission reception points (TRPs). In the preceding scheme, the mutual interference between reference signals is still severe.

SUMMARY

The present application provides an information feedback method and apparatus, an information receiving method and apparatus, a device, and a storage medium so as to avoid mutual interference between reference signals.

An embodiment of the present application provides an information feedback method. The method is applied to a first node and includes the following:

A report configuration sent by a second node is received; channel state information is determined according to the report configuration, where the channel state information includes a reference signal, and the reference signal satisfies a grouping criterion associated with the report configuration; and the channel state information is fed back to the second node through a report instance.

An embodiment of the present application provides an information receiving method. The method is applied to a second node and includes the following:

A report configuration is configured; the report configuration is sent to a first node, and the first node determines channel state information according to the report configuration, where the channel state information includes a reference signal, the reference signal satisfies a grouping criterion associated with the report configuration; and the channel state information fed back by the first node through a report instance is received.

An embodiment of the present application provides an information feedback apparatus. The apparatus is applied to a first node and includes a first receiving module, a determination module, and a feedback module.

The first receiving module is configured to receive a report configuration sent by a second node. The determination module is configured to determine channel state information according to the report configuration, where the channel state information includes a reference signal, and the reference signal satisfies a grouping criterion associated with the report configuration. The feedback module is configured to feed back the channel state information to the second node through a report instance.

An embodiment of the present application provides an information receiving apparatus. The apparatus is applied to a second node and includes a configuration module, a sending module, and a second receiving module.

The configuration module is configured to configure a report configuration. The sending module is configured such that a first node determines channel state information according to the report configuration, where the channel state information includes a reference signal, and the reference signal satisfies a grouping criterion associated with the report configuration. The second receiving module is configured to receive the channel state information fed back by the first node through a report instance.

An embodiment of the present application provides a device. The device includes one or more processors and a memory configured to store one or more programs.

The one or more programs, when executed by the one or more processors, cause the one or more processors to perform the method according to embodiments of the present application.

An embodiment of the present application provides a storage medium storing a computer program, the computer program, when executed by a processor, causes the processor to perform the method according to the embodiments of the present application.

The present application provides an information feedback method and apparatus, an information receiving method and apparatus, a device, and a storage medium. The first node receives the report configuration sent by the second node; the first node determines the channel state information according to the report configuration, where the channel state information includes the reference signal, and the reference signal satisfies the grouping criterion associated with the report configuration; and the first node feeds back the channel state information to the second node through the report instance. In this manner, mutual interference between reference signals is avoided.

DETAILED DESCRIPTION

Figure 1:
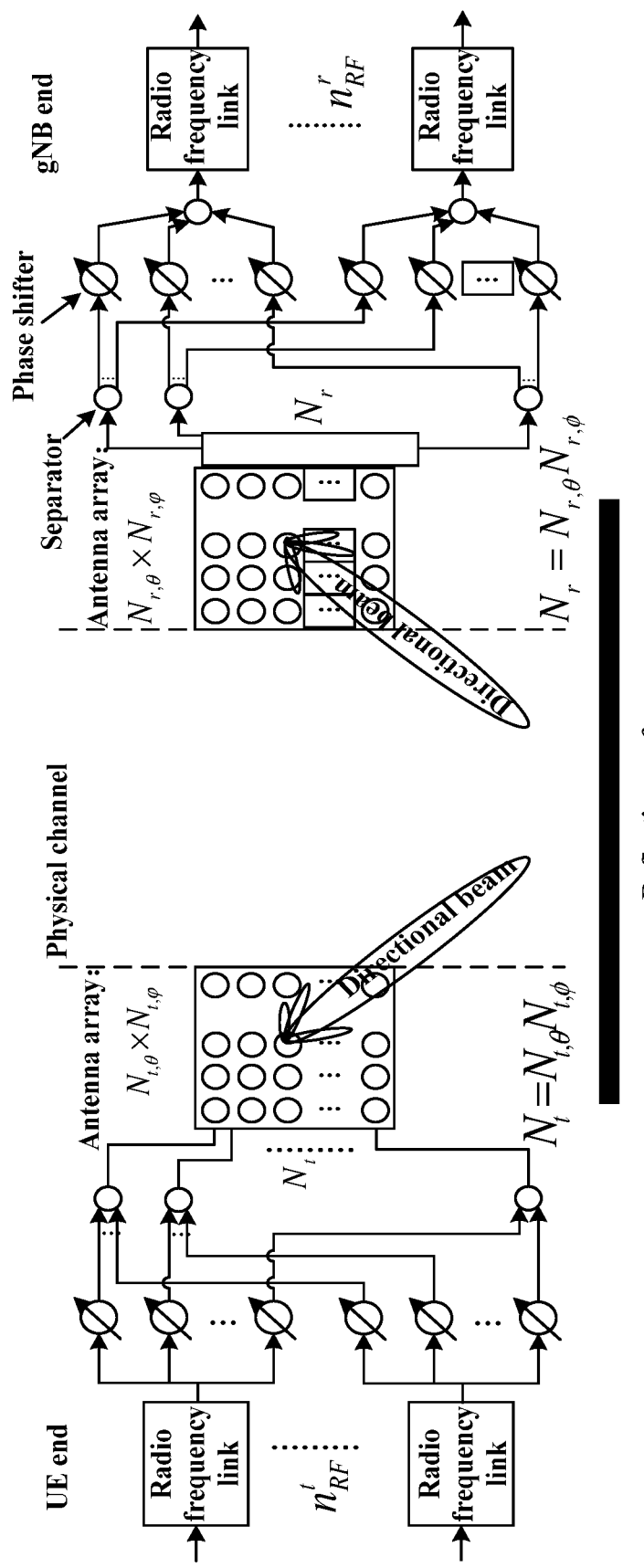
FIG. 1 is a structural diagram of a hybrid pre-coding transceiver according to the present application.

Embodiments of the present application are described below in conjunction with drawings.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from those described herein.

The technical solutions of the present application may be applied to various communication systems, such as the global system of mobile communication (GSM), the code division multiple access (CDMA) system, the wideband code division multiple Access (WCDMA) system, the general packet radio service (GPRS), the long term evolution (LTE) system, the advanced long term evolution (LTE-A) system, the universal mobile telecommunication system (UMTS), and the 5th generation mobile communication technology (5G) system, which are not limited in the embodiments of the present application. In the present application, a 5G system is used as an example.

In the embodiments of the present application, a base station may be a device capable of communicating with a user terminal. The base station may be any device having the radio transceiving function. The base state includes, but is not limited to, a base station (NodeB), an evolved NodeB (eNodeB), a base station in the 5G communication system, a base station in a future communication system, an access node in a wireless-fidelity (Wi-Fi) system, a wireless relay node, and a wireless backhaul node. The base station may also be a radio controller in a cloud radio access network (CRAN) scenario, the base station may also be a small cell and a transmission receive point (TRP), and the base station is not limited in the embodiments of the present application. In the present application, the 5G base station is used as an example.

In the embodiments of the present application, the user terminal is a device having a radio transceiving function and may be deployed on land, including an indoor or outdoor device, a handheld device, a wearable device, or a vehicle-mounted device; the device may also be deployed on water (such as in ships); and the device may also be deployed in the air (such as in airplanes, balloons and satellites). The user terminal may be a mobile phone, a Pad, a computer having the radio transceiving function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, and a wireless terminal in a smart home. Application scenarios are not limited to the embodiments of the present application. Sometimes the user terminal may also be referred to as a terminal, an access terminal, a user equipment (UE) unit, a UE station, a mobile station, a mobile platform, a remote station, a remote terminal, a mobile device, a UE terminal, a wireless communication device, a UE agent, or a UE apparatus. The user terminal is not limited to the embodiments of the present application.

The technical terms involved in the embodiments of the application are briefly described below.

High-frequency bands with ultra-wide transmission bandwidths (that is, millimeter wave communications) become an important mobile communication development direction in the future and attract the attention of the global academia and industry. The advantages of millimeter waves become increasingly attractive with increasingly congested spectrum resources and access of a huge number of physical networks. Standardization is started in many standardization organizations such as the Institute of Electrical and Electronics Engineers (IEEE) and the 3rd generation partnership project (3GPP). For example, in 3GPP standard groups, due to the advantage of a large bandwidth, high-frequency band communications become an important innovation point of a new radio access technology (RAT) compatible in the 5G.

In a training process of antenna weights (also referred to as pre-coding or beams), a high-frequency band transmitting end sends a training reference signal, and a high-frequency band receiving end receives channels and performs channel estimation. Then the high-frequency band receiving end needs to feed back channel state information to the high-frequency band transmitting end so that a transceiver may select, from optional transceiver antenna weight pairs, multiple groups of transceiver antenna weight pairs used for multiplex data transmission, thereby improving overall spectrum efficiency.

For the base station, multiple antenna panels exist, and each antenna panel may generate multiple beams. For a UE side, a similar case exists (for example, for an above-6 GHz UE side, communications such as millimeter wave communications exist). Therefore, the core of beam reporting (also referred to as channel state information feedback) is to provide an optimal combination solution in a hybrid situation of analog domain and/or digital domain.

FIG. 1 is a structural diagram of a hybrid pre-coding (hybrid analog and digital beamforming) transceiver according to the present application. As shown in FIG. 1, the transmitting end and the receiving end of the system are configured with multiple antenna units and multiple radio frequency links. Each radio frequency link is connected to an antenna array unit (the scenario of partial connection is not excluded), and each antenna unit has a digital keying phase shifter. A high-frequency band system implements beamforming of an analog terminal by loading different amounts of phase shifts on signals of each antenna unit. In a hybrid beamforming transceiver, multiple radio frequency signal streams exist. Each signal stream is loaded with a pre-coding antenna weight vector (AWV) via the digital keying phase shifter and sent from the multiple antenna units to a high-frequency band physical transmission channel. At the receiving end, radio frequency signal streams received by the multiple antenna units are weighted and combined into a single signal stream, and after radio frequency demodulation is performed at the receiving end, a receiver finally obtains multiple received signal streams which are sampled and received by a digital baseband.

At the same time, the transmitting end and the receiving end may include multiple panels to better support spatial multiplexing and reduce the complexity of hardware implementation. Under each panel, the number of effective beams is asymmetric to the maximum number of transmitting beams that can be actually supported, that is, the number of beams that can be transmitted at each moment, e.g., the number of transceiver units (TXRUs), is much less than the number of selectable beams.

Figure 2:
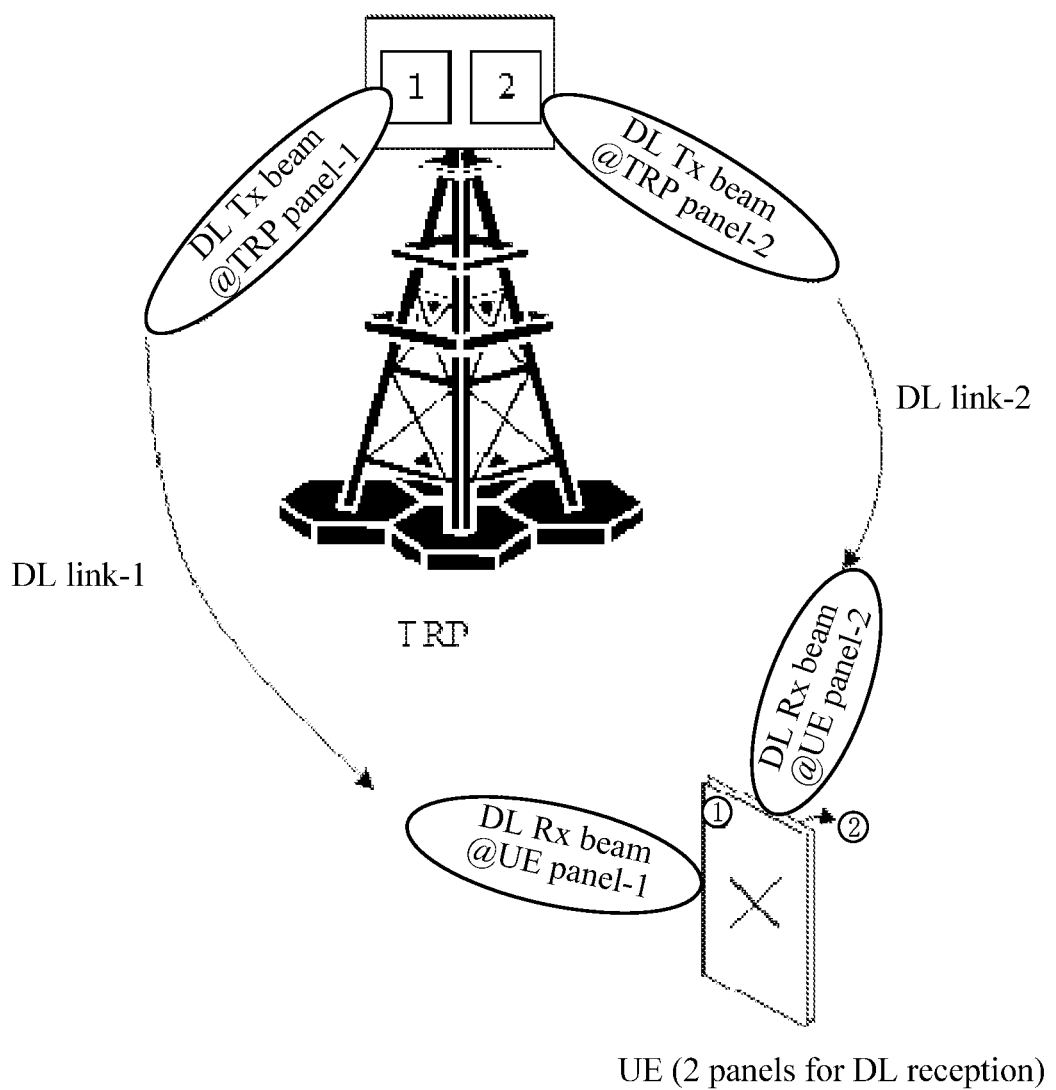
FIG. 2 is a schematic diagram of downlink transmission of multiple antenna groups according to the present application.

When a TRP/UE has multiple antenna groups, each antenna group may generate a corresponding transmitting or receiving beam. FIG. 2 is a schematic diagram of downlink transmission of multiple antenna groups according to the present application. For example, antenna group-1 (also referred to as panel-1) of the TRP and antenna group-1 of the UE generate the transmitting beam and the receiving beam, respectively, for serving downlink (DL) link-1; and antenna group-2 of the TRP and antenna group-2 of the UE generate the transmitting beam and the receiving beam, respectively, for serving DL link-2. DL link-1 and DL link-2 may be associated with two different antenna ports separately, or DL link-1 and DL link-2 may be associated with the same antenna port.

Figure 3:
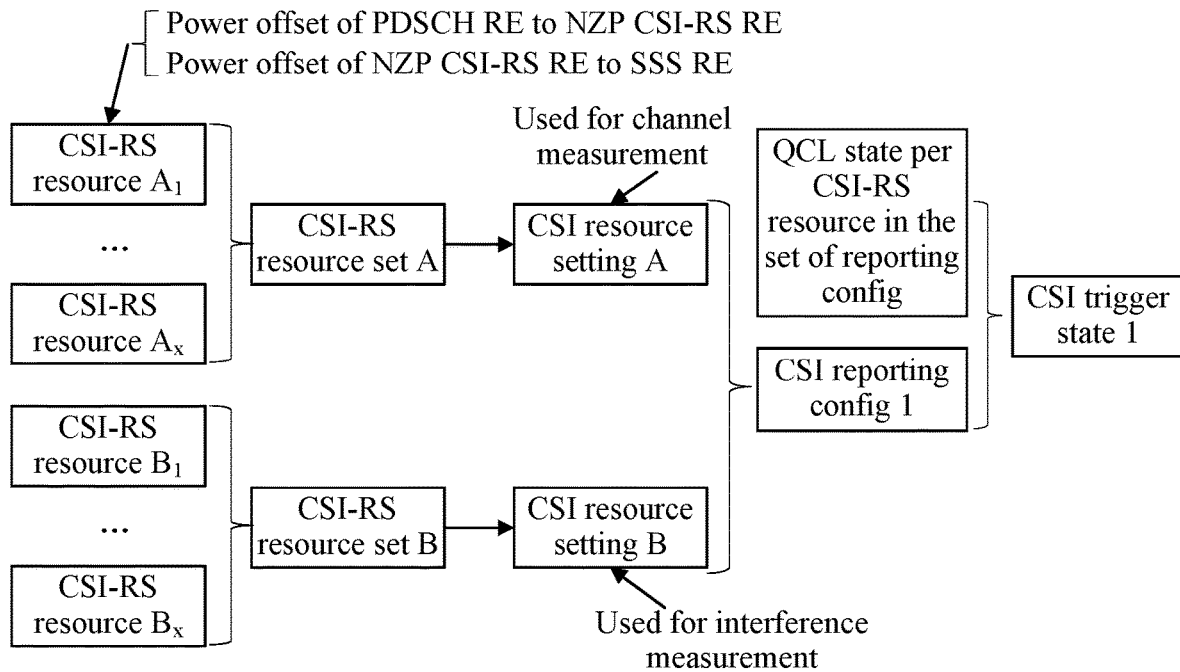
FIG. 3 is a schematic diagram illustrating a framework of an aperiodic channel state information (CSI) triggering state configuration according to the present application.

To support a reporting process of the channel state information (CSI), the base station end needs to configure parameters related to the CSI feedback. An aperiodic CSI triggering state configuration mode is discussed first, as shown in FIG. 3. Multiple channel state information-reference signal (CSI-RS) resources are combined into one CSI-RS resource set, and the one CSI-RS resource set is associated with one CSI resource setting (also referred to as a CSI-RS resource config). One or more CSI resource settings may be associated with one CSI report configuration (CSI reporting config), when one CSI report configuration is associated with multiple CSI resource settings, the multiple CSI resource settings may be used for channel measurement or interference measurement separately. In the CSI reporting config, a quasi co-location (QCL) state for each associated aperiodic CSI-RS needs to be provided additionally.

Furthermore, the base station end may flexibly configure the relevant deviation between the transmission power of the reference signal and the transmission power during the actual data transmission thereafter through parameters. Power offset parameters include a power offset (referred to as Pc) from a physical downlink shared channel resource element (PDSCH RE) to a CSI-RS (in FIG. 3, a non-zero-power (NZP) CSI-RS) and a power offset (referred to as Pss) from an NZP CSI-RS RE to a secondary synchronization signal (SSS) RE. Pss is configured on the CSI-RS resource.

Figure 4:
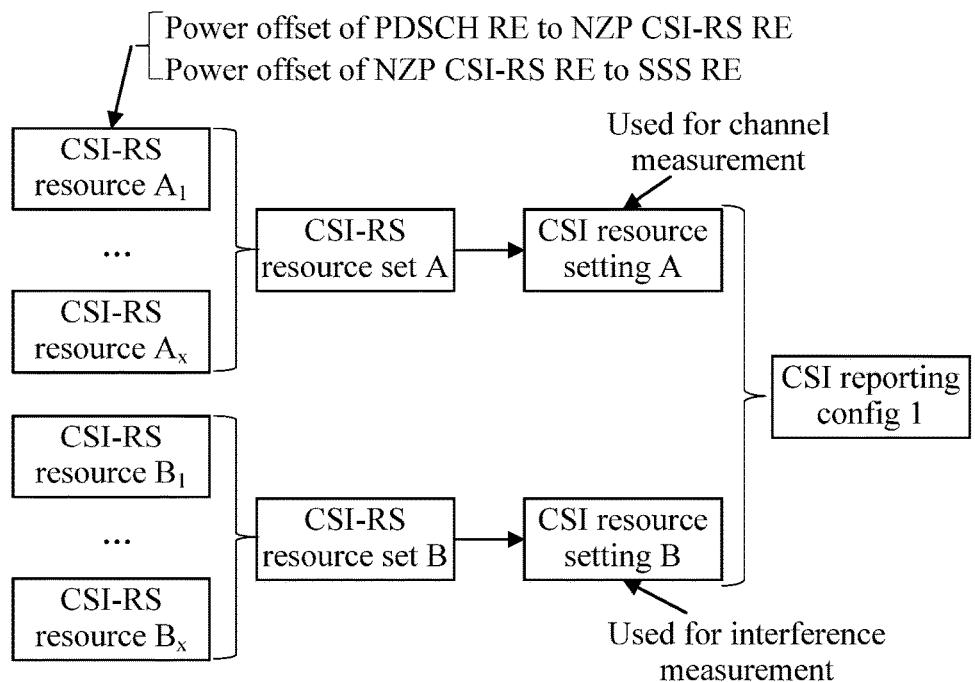
FIG. 4 is a schematic diagram illustrating a framework of a periodic or semi-persistent CSI feedback configuration according to the present application.

Then, for configurations of both a semi-persistent CSI reference signal and a period CSI reference signal, the CSI trigger state and the QCL state per CSI-RS resource in the set of reporting config in FIG. 3 do not need to be configured, as shown in FIG. 4. The QCL state of the periodic CSI-RS and the QCL state of the semi-persistent CSI-RS are directly configured to the corresponding CSI-RS resources through a medium access control-control element (MAC-CE) or a radio resource control (RRC) message.

Figure 5:
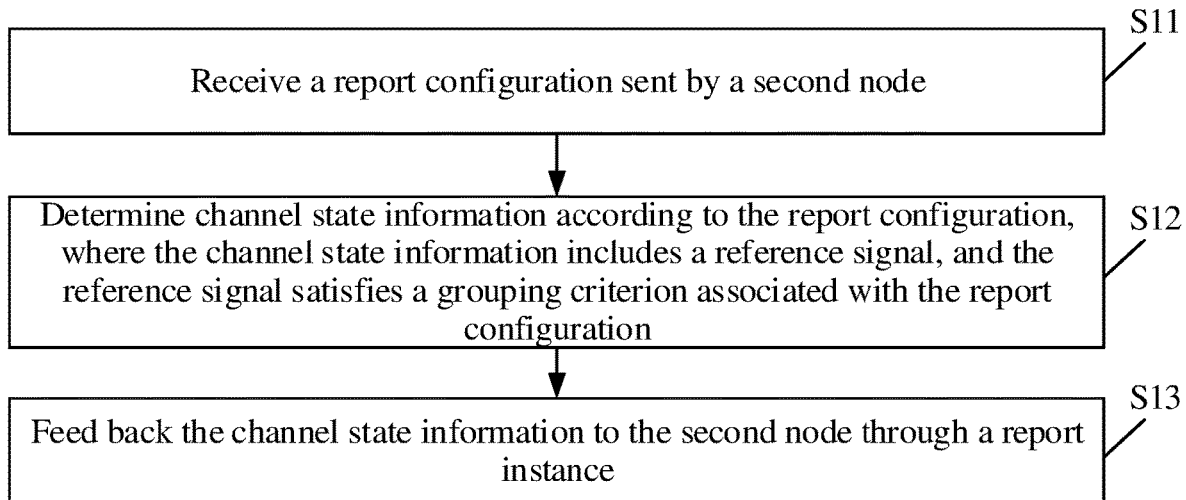
FIG. 5 is a flowchart of an information feedback method according to an embodiment of the present application.

In an embodiment, an embodiment of the present application provides an information feedback method applied to a first node. As shown in FIG. 5, the information feedback method provided in this embodiment includes S11, S12, and S13.

In S11, a report configuration sent by a second node is received.

In S12, channel state information is determined according to the report configuration, where the CSI includes a reference signal, and the reference signal satisfies a grouping criterion associated with the report configuration.

In S13, the channel state information is fed back to the second node through a report instance.

In this embodiment, the first node may be one or more of any of the terminals provided above, and the second node may be one or more of any of the base stations provided above.

In this embodiment, the beam may be understood as a resource (for example, a reference signal resource, a transmitting end spatial filter, a receiving end spatial filter, transmitting end pre-coding, receiving end pre-coding, an antenna port, an antenna weight vector, and an antenna weight matrix). Since the beam may be bound to some time-frequency code resources for transmission, a beam serial number may be replaced with a resource index (for example, a reference signal resource index). The beam may also be a transmission (sending/receiving) mode. The transmission mode may include spatial multiplexing, frequency/time domain diversity, and the like.

Furthermore, the base station end may perform quasi co-location configuration on two reference signals and inform the UE end, so as to describe the channel characteristic hypothesis. Parameters involved in the quasi co-location include at least the Doppler spread, the Doppler shift, the delay spread, the average delay, the average gain, the spatial Rx parameter, or the spatial parameter. The spatial parameter may include the spatial Rx parameter such as an angle of arrival, spatial correlation of receiving beams, the average delay, and correlation (including phase information) of time-frequency channel responses.

A group based report refers to a method in which reference signals are grouped (alternatively, referred to as grouping beams) and a result after grouping is reported to the base station side.

The report configuration refers to that the base station end performs the quasi co-location configuration on multiple reference signals.

In an example embodiment, the channel state information further includes one or more of the following: grouping information, a reference signal receiving power (RSRP), or a signal to interference plus noise ratio (SINR).

The channel state information further includes a pre-coding matrix indicator (PMI), a channel quality indicator (CQI), the reference signal receiving power (RSRP), the signal to interference plus noise ratio (SINR), a reference signal received quality (RSRQ), a rank indicator (RI), and the like.

The grouping information refers to information about grouping one or more reference signals, a reference signal resource set, a panel, a sub-array, an antenna group, an antenna port group, a beam group, a transmission entity/unit, or a reception entity/unit. In addition, the grouping information is equivalent to a group state or a group index.

In an example embodiment, multiple report configurations have an association relationship, or multiple report instances have an association relationship.

In an example embodiment, the association relationship between the multiple report configurations or the association relationship between the multiple report instances is determined through at least one of the following signaling: RRC signaling, media access control-control element (MAC-CE) signaling, or downlink control information (DCI) signaling.

In an example embodiment, the multiple report configurations are associated with the same transmission parameter, where the transmission parameter includes one or more of the following: an association identifier, a triggering state, a time domain characteristic, a bandwidth part (BWP), a component carrier (CC), or a repetition parameter.

In an example embodiment, the multiple report configurations are associated with different control resource pool identifiers.

In an example embodiment, the multiple report instances having the association relationship are in the same time domain unit configured by the second node or predefined.

The time domain unit includes at least one of the following: a sub-symbol, a symbol, a slot, a subframe, a frame, or a transmission occasion.

In an example embodiment, reference signals in the multiple report instances constitute one or more groups, and the multiple report instances satisfy the grouping criterion.

In an example embodiment, the grouping criterion includes one or more of the following: reference signals in respective report instances from different report configurations are capable of being received simultaneously; or reference signals in the same report instance from the same report configurations are not capable of being received simultaneously.

In an example embodiment, the grouping criterion includes one or more of the following: reference signals in respective report instances from different report configurations are not capable of being received simultaneously; or reference signals in the same report instance from the same report configuration are capable of being received simultaneously.

In an example embodiment, the grouping criterion includes one or more of the following: a beam grouping criterion or an antenna grouping criterion.

An antenna group may be at least one of the following: a beam group, an antenna port group, an antenna panel, a panel, a UE panel, or a reference signal resource set.

In an example embodiment, in the case where the channel state information includes the SINR, the reference signal satisfies the beam grouping criterion; or in the case where the channel state information includes the RSRP, the reference signal satisfies the antenna grouping criterion.

In an example embodiment, the antenna grouping criterion includes one or more of the following: reference signals within one group are not capable of being received simultaneously; reference signals in different groups are capable of being received simultaneously; reference signals within one group are not capable of being sent simultaneously; or reference signals in different groups are capable of being sent simultaneously.

In an example embodiment, the beam grouping criterion includes one or more of the following: reference signals within one group are capable of being received simultaneously; reference signals in different groups are not capable of being received simultaneously; reference signals within one group are capable of being sent simultaneously; or reference signals in different groups are not capable of being sent simultaneously.

A group based report refers to a method in which reference signals are grouped (alternatively, referred to as grouping beams) and the result after grouping is reported to the base station side. The grouping criterion includes one of or a combination of the following: 1) reference signals within one group are not capable of being received simultaneously; 2) reference signals between groups are capable of being received simultaneously; 3) reference signals within one group are capable of being received simultaneously; 4) reference signals between groups are not capable of being received simultaneously; 5) multiplexing transmission cannot be supported under reference signals within one group; 6) multiplexing transmission can be supported under reference signals within one group; 7) multiplexing transmission cannot be supported under reference signals between groups; 8) multiplexing transmission can be supported under reference signals between groups; 9) reference signals within one group are not capable of being sent simultaneously; or 10) reference signals within one group are capable of being sent simultaneously.

For example, a reference signal transmitting end may indicate that the reference signals are grouped based on the following criteria {3, 4, 6}: {reference signals within one group are capable of being received simultaneously, and multiplexing transmission can be supported under reference signals within one group; and reference signals between groups are not capable of being received simultaneously}.

The beam group-based grouping criterion is defined as follows: reference signals within one group are capable of being sent or received simultaneously, and/or reference signals in different groups are not capable of being sent or received simultaneously.

The antenna group-based grouping criterion is defined as follows: reference signals within one group are not capable of being sent or received simultaneously, and/or reference signals in different groups are capable of being sent or received simultaneously.

The antenna group-based grouping criterion is defined as follows: more than N reference signals within one group are capable of being sent or received simultaneously, and/or no more than N reference signals within one group are capable of being sent or received simultaneously, where N is an integer greater than or equal to 1.

The reference signal includes at least one of the following: a channel state information-reference signal (CSI-RS), a channel state information-interference measurement (CSI-IM), a demodulation reference signal (DMRS), a downlink DMRS (DL DMRS), an uplink DMRS (UL DMRS), a sounding reference signal (SRS), a phase tracking-reference signal (PT-RS), a random access channel (RACH), a synchronization signal (SS), a synchronization signal (SS) block (also referred to as synchronization signal/physical broadcast channel block (SS/PBCH block)), a primary synchronization signal (PSS), or a secondary synchronization signal (SSS).

An uplink reference signal includes at least one of the following: a DMRS, a UL DMRS, a UL PT-RS, an SRS, or a physical RACH (PRACH).

A downlink reference signal includes at least one of the following: a DMRS, a DL DMRS, a DL PT-RS, a CSI-RS, or an SS block.

In an example embodiment, the control resource pool identifier is also referred to as a pool identifier of a control resource set or a control resource set (CORESET) pool identifier (ID).

In an example embodiment, among multiple report configurations, one of the multiple report configurations is configured with a specific identifier for indicating that the report instance corresponding to the one report configuration is the leading report instance among multiple report instances.

In an example embodiment, a corresponding time identifier is configured in each of the multiple report configurations and used for indicating an effective time of the report instance corresponding to the report configuration; or each report instance carries time indication information used for indicating an effective time of the report instance and determined by the first node.

In an example embodiment, the report configuration carries grouping information, and grouping information corresponding to the report instance is the same as the grouping information carried in the report configuration.

In an example embodiment, the report configuration carries grouping information, and grouping information corresponding to the report instance needs to be different from the grouping information carried in the report configuration.

In an example embodiment, a method for determining the channel state information includes the following:

N groups are created and the parameter i is set to 0; one or more of the following information for an $i^{th}$ group is determined from a channel state set: a reference signal set $K_i$, grouping information $I_i$, or an antenna panel set $L_i$; if the parameter i is less than N−1, an element in the channel state set associated with the grouping information $I_i$ or the antenna panel set $L_i$ is removed so as to obtain the updated channel state set, i is set to i+1, and the method returns to determining the one or more of the following information for the $i^{th}$ group from the channel state set: the reference signal set $K_i$, the grouping information $I_i$, or the antenna panel set $L_i$; and if the parameter i is equal to N−1, the N groups are outputted.

In an example embodiment, when the report configuration includes the feedback using the RSRP and the antenna grouping criterion, a method for determining the channel state information includes the following:

N groups are created and the parameter i is set to 0; the best reference signal and best grouping information are determined from an RSRP set; reference signals having the top S RSRPs are determined under the best grouping information; the S reference signals are determined to be a reference signal set $K_i$ for an $i^{th}$ group and the best grouping information is determined to be grouping information $I_i$ for the $i^{th}$ group; if the parameter i is less than N−1, an element in the RSRP set associated with the best grouping information is removed to obtain the updated RSRP set, i is set to i+1, and the method returns to executing that the best reference signal and the best grouping information are determined from the RSRP set; and if the parameter i is equal to N−1, the N groups are outputted.

In an example embodiment, when the report configuration includes the feedback using the RSRP and the beam grouping criterion, a method for determining the channel state information includes the following:

N groups are created and the parameter i is set to 0; user antenna panels having the top S RSRPs and reference signals having the top S RSRPs are determined from an RSRP set; the S reference signals are determined to be a reference signal set $K_i$ for an $i^{th}$ group and the S user antenna panels are determined to be an antenna panel set $L_i$; if the parameter i is less than N−1, an element in the RSRP set associated with the S reference signals and the S user antenna panels is removed to obtain the updated RSRP set, i is set to i+1, and the method returns to executing that the user antenna panels having the top S RSRPs and the reference signals having the top S RSRPs are determined from the RSRP set; and if the parameter i is equal to N−1, the N groups are outputted.

In an example embodiment, when the report configuration includes the feedback using the SINR and the antenna grouping criterion, a method for determining the reference signal in the report instance includes the following:

N groups are created and the parameter i is set to 0; the best reference signal and best grouping information are determined from an SINR set; reference signals having the top S SINRs are determined under the best grouping information; the S reference signals are determined to be a reference signal set $K_i$ for an $i^{th}$ group and the best grouping information is determined to be grouping information $I_i$ for the $i^{th}$ group; if the parameter i is less than N−1, an element in the SINR set associated with the best grouping information is removed to obtain the updated SINR set, i is set to i+1, and the method returns to executing that the best reference signal and the best grouping information are determined from the SINR set; and if the parameter i is equal to N−1, the N groups are outputted.

In an example embodiment, when the report configuration includes the feedback using the SINR and the beam grouping criterion, a method for determining the reference signal in the report instance includes the following:

N groups are created and the parameter i is set to 0; combinations of reference signals and antenna panels of the best SINRs are selected in sequence from an RSRP set; the selected combinations of reference signals and antenna panels are used as a noise part and reference signals having the top S SINRs and user antenna panels having the top S SINRs are determined; the S reference signals are determined to be a reference signal set $K_i$ for an $i^{th}$ group and the user antenna panels having the top S SINRs are determined to be an antenna panel set $L_i$; if the parameter i is less than N−1, an element in the RSRP set associated with the S reference signals and with the S user antenna panels is removed to obtain the updated RSRP set, i is set to i+1, and the method returns to executing that the combinations of reference signals and antenna panels of the best SINRs are selected in sequence from the RSRP set; and if the parameter i is equal to N−1, the N groups are outputted.

In an example embodiment, in one beam group, an SINR associated with the reference signal is determined by other reference signals within the one beam group.

In an example embodiment, the SINR associated with the reference signal is determined by the other reference signals within the beam group in the following manner: determining the other reference signals within the beam group to be interference and/or noise of the SINR associated with the reference signal.

In an example embodiment, the SINR corresponding to a $y^{th}$ reference signal in an $x^{th}$ group is represented by the formula described below.

$$\frac{P(K_x(y), L_x(y))}{n(K_x(y), L_x(y)) + \sum_{m \in (K_x \backslash K_x(y))} I(m; K_x(y), L_x(y))}$$

$K_x(y)$ denotes a reference signal sent by the second node corresponding to the $y^{th}$ reference signal index in the $x^{th}$ group, $L_x(y)$ denotes an antenna group of the first node corresponding to the $y^{th}$ reference signal index in the $x^{th}$ group, $P(K_x(y), L_x(y))$ denotes received signal power under $K_x(y)$ and $L_x(y)$, $n(K_x(y), L_x(y))$ denotes noise power under $K_x(y)$ and $L_x(y)$, $I(m; K_x(y), L_x(y))$ denotes received signal power of an $m^{th}$ reference signal received according to a receiving antenna panel and a receiving beam that are determined under $K_x(y)$ and $L_x(y)$, and $m \in (K_x \backslash K_x(y))$ denotes that m belongs to one of the remaining elements in a set $K_x$ except the element $K_x(y)$.

In an example embodiment, information feedback includes one or more of the following: a periodic CSI report, a semi-persistent CSI report, or an aperiodic CSI report.

In an example embodiment, in the case where the information feedback is the periodic CSI report or the semi-persistent CSI report, within one preset time unit, the first node is prohibited from associating the same grouping information with report instances corresponding to different report configurations. An association relationship of report configurations in the periodic CSI report is configured through RRC signaling, or an association relationship of report configurations in the semi-persistent CSI report is configured through MAC-CE signaling.

In an example embodiment, multiple report configurations having an association relationship are determined in the following manner: in the aperiodic CSI report, the multiple report configurations associated with the same triggering state or with the same trigger signaling are determined to have the association relationship.

Figure 6:
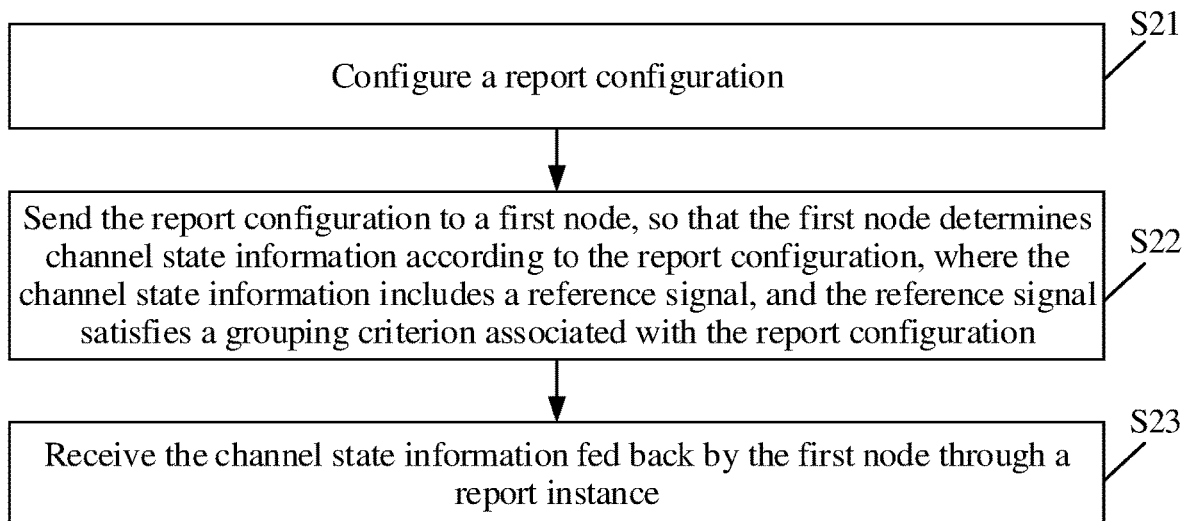
FIG. 6 is a flowchart of an information receiving method according to an embodiment of the present application.

In an embodiment, an embodiment of the present application provides an information receiving method applied to a second node. As shown in FIG. 6, the information receiving method provided in this embodiment includes S21, S22, and S23.

In S21, a report configuration is configured.

In S22, the report configuration is sent to a first node, so that the first node determines channel state information according to the report configuration, where the CSI includes a reference signal, and the reference signal satisfies a grouping criterion associated with the report configuration.

In S23, the channel state information fed back by the first node through a report instance is received.

In an example embodiment, the channel state information further includes one or more of the following: grouping information, a reference signal receiving power (RSRP), or a signal to interference plus noise ratio (SINR).

In an example embodiment, multiple report configurations have an association relationship, or multiple report instances have an association relationship.

In an example embodiment, the association relationship among the multiple report configurations or the association relationship among the multiple report instances is determined through at least one of the following signaling: RRC signaling, MAC-CE signaling, or DCI signaling.

In an example embodiment, the multiple report configurations are associated with the same transmission parameter.

The transmission parameter includes one or more of the following: an association identifier, a triggering state, a time domain characteristic, a bandwidth part (BWP), a component carrier (CC), or a repetition parameter.

In an example embodiment, the multiple report configurations are associated with different control resource pool identifiers.

In an example embodiment, multiple report instances having the association relationship are in the same time domain unit configured by the second node or predefined.

In an example embodiment, reference signals in the multiple report instances constitute one or more groups, and the multiple report instances satisfy the grouping criterion.

In an example embodiment, the grouping criterion includes one or more of the following: reference signals in respective report instances from different multiple report configurations are capable of being received simultaneously; or reference signals in the same report instance from the same report configuration are not capable of being received simultaneously.

In an example embodiment, the grouping criterion includes one or more of the following: reference signals in respective report instances from different report configurations are not capable of being received simultaneously; or reference signals in the same report instance from the same report configuration are capable of being received simultaneously.

In an example embodiment, the grouping criterion includes one or more of the following: a beam grouping criterion or an antenna grouping criterion.

In an example embodiment, in the case where the channel state information includes the SINR, the reference signal satisfies the beam grouping criterion; or in the case where the channel state information includes the RSRP, the reference signal satisfies the antenna grouping criterion.

In an example embodiment, the antenna grouping criterion includes one or more of the following: reference signals within one group are not capable of being received simultaneously; reference signals in different groups are capable of being received simultaneously; reference signals within one group are not capable of being sent simultaneously; or reference signals in different groups are capable of being sent simultaneously.

In an example embodiment, the beam grouping criterion includes one or more of the following: reference signals within one group are capable of being received simultaneously; reference signals in different groups are not capable of being received simultaneously; reference signals within one group are capable of being sent simultaneously; or reference signals in different groups are not capable of being sent simultaneously.

In an example embodiment, among multiple report configurations, one of the multiple report configurations is configured with a specific identifier for indicating that the report instance corresponding to the one report configuration is the leading report instance among multiple report instances.

In an example embodiment, a corresponding time identifier is configured in each of the multiple report configurations and used for indicating an effective time of the report instance corresponding to the report configuration; or each report instance carries time indication information used for indicating an effective time of the report instance and determined by the first node.

In an example embodiment, the report configuration carries grouping information, and grouping information corresponding to the report instance is the same as the grouping information carried in the report configuration.

In an example embodiment, the report configuration carries grouping information, and grouping information corresponding to the report instance needs to be different from the grouping information carried in the report configuration.

In an example embodiment, a method for determining the channel state information includes the following:

N groups are created and the parameter i is set to 0; one or more of the following information for an $i^{th}$ group is determined from a channel state set: a reference signal set $K_i$, grouping information $I_i$, or an antenna panel set $L_i$; if the parameter i is less than N−1, an element in the channel state set associated with the grouping information $I_i$ or the antenna panel set $L_i$ is removed to obtain the updated channel state set, i is set to i+1, and the method returns to executing that one or more of the following information for the $i^{th}$ group is determined from the channel state set: the reference signal set $K_i$, the grouping information $I_i$, or the antenna panel set $L_i$; and if the parameter i is equal to N−1, the N groups are outputted.

In an example embodiment, when the report configuration includes the feedback using the RSRP and the antenna grouping criterion, a method for determining the channel state information includes the following:

N groups are created and the parameter i is set to 0; the best reference signal and best grouping information are determined from an RSRP set; reference signals having the top S RSRPs are determined under the best grouping information; the S reference signals are determined to be a reference signal set $K_i$ for an $i^{th}$ group and the best grouping information is determined to be grouping information $I_i$ for the $i^{th}$ group; if the parameter i is less than N−1, an element in the RSRP set associated with the best grouping information is removed to obtain the updated RSRP set, i is set to i+1, and the method returns to executing that the best reference signal and the best grouping information are determined from the RSRP set; and if the parameter i is equal to N−1, the N groups are outputted.

In an example embodiment, when the report configuration includes the feedback using the RSRP and the beam grouping criterion, a method for determining the channel state information includes the following:

N groups are created and the parameter i is set to 0; user antenna panels having the top S RSRPs and reference signals having the top S RSRPs are determined from an RSRP set; the S reference signals are determined to be a reference signal set $K_i$ for an $i^{th}$ group and the S user antenna panels are determined to be an antenna panel set $L_i$; if the parameter i is less than N−1, an element in the RSRP set associated with the S reference signals and the S user antenna panels is removed to obtain the updated RSRP set, i is set to i+1, and the method returns to executing that the user antenna panels having the top S RSRPs and the reference signals having the top S RSRPs are determined from the RSRP set; and if the parameter i is equal to N−1, the N groups are outputted.

In an example embodiment, when the report configuration includes the feedback using the SINR and the antenna grouping criterion, a method for determining the reference signal in the report instance includes the following:

N groups are created and the parameter i is set to be 0; the best reference signal and best grouping information are determined from an SINR set; reference signals having the top S SINRs are determined under the best grouping information; the S reference signals are determined to be a reference signal set $K_i$ for an $i^{th}$ group and the best grouping information is determined to be grouping information $I_i$ for the $i^{th}$ group; if the parameter i is less than N−1, an element in the SINR set associated with the best grouping information is removed to obtain the updated SINR set, i is set to i+1, and the method returns to executing that the best reference signal and the best grouping information are determined from the SINR set; and if the parameter i is equal to N−1, the N groups are outputted.

In an example embodiment, when the report configuration includes the feedback using the SINR and the beam grouping criterion, a method for determining the reference signal in the report instance includes the following:

N groups are created and the parameter i is set to 0; combinations of reference signals and antenna panels of best SINR are selected in sequence from an SINR set; the selected combinations of reference signals and antenna panels are used as the noise part and reference signals having the top S SINRs and user antenna panels having the top S SINRs are determined; the S reference signals are determined to be a reference signal set $K_i$ for an $i^{th}$ group and the user antenna panels having the top S SINRs are determined to be an antenna panel set $L_i$; if the parameter i is less than N−1, an element in the SINR set associated with the S reference signals and the S user antenna panels is removed so as to obtain the updated SINR set, i is set to i+1, and the method returns to executing that the combinations of reference signals and antenna panels of best SINRs are selected in sequence from the SINR set; and if the parameter i is equal to N−1, the N groups are outputted.

In an example embodiment, within one beam group, an SINR associated with the reference signal is determined by other reference signals within this beam group.

In an example embodiment, the SINR associated with the reference signal is determined by the other reference signals within the beam group in the manner of determining the other reference signals within the beam group to be interference and/or noise of the SINR associated with the reference signal.

In an example embodiment, the SINR corresponding to a $y^{th}$ reference signal in an $x^{th}$ group is represented by the formula described below.

$$\frac{P(K_x(y), L_x(y))}{n(K_x(y), L_x(y)) + \sum_{m \in (K_x \backslash K_x(y))} I(m; K_x(y), L_x(y))}.$$

$K_x(y)$ denotes a reference signal sent by the second node corresponding to the $y^{th}$ reference signal index in the $x^{th}$ group, $L_x(y)$ denotes an antenna group of the first node corresponding to the $y^{th}$ reference signal index in the $x^{th}$ group, $P(K_x(y), L_x(y))$ denotes the received signal power under $K_x(y)$ and $L_x(y)$, $n(K_x(y), L_x(y))$ denotes the noise power under $K_x(y)$ and $L_x(y)$, $I(m; K_x(y), L_x(y))$ denotes received signal power of an $m^{th}$ reference signal received according to a receiving antenna panel and a receiving beam that are determined under $K_x(y)$ and $L_x(y)$, and $m \in (K_x \backslash K_x(y))$ denotes that m belongs to one of the remaining elements in a set $K_x$ except the element $K_x(y)$.

In an example embodiment, information feedback includes one or more of the following: a periodic CSI report, a semi-persistent CSI report, or an aperiodic CSI report.

In an example embodiment, in the case where the information feedback is the periodic CSI report or the semi-persistent CSI report, within one preset time unit, the first node is prohibited from associating the same grouping information with report instances corresponding to different report configurations. An association relationship of report configurations in the periodic CSI report is configured through RRC signaling, or an association relationship of report configurations in the semi-persistent CSI report is configured through MAC-CE signaling.

In an example embodiment, multiple report configurations having an association relationship are determined in the manner of determining, in the aperiodic CSI report, that multiple report configurations associated with the same triggering state or the same trigger signaling have the association relationship.

In an embodiment, a method for reporting the channel state information under multiple report instances is provided.

The group based report is carried by a CSI report instance. The report instance may include multiple groups, where each group includes one or more reference signal indices and corresponding channel state information (CSI). The grouping criterion mainly includes the antenna grouping or the beam grouping. However, in a non-ideal backhaul scenario, a relatively large delay exists between transmission receive points, so the problem of inefficient real-time sharing of the group based report and other information may occur.

To flexibly adapt to the problem of whether an ideal backhaul link exists between multiple transmission receive points, it is necessary to consider whether the report result is reported through the same report instance or the report result is reported to corresponding transmission receive points separately through multiple report instances. If multiple report instances are separately reported to multiple transmission receive points, the association relationship among the multiple report instances needs to be discussed in a scenario of real-time movement and selection at the UE end.

The UE end first needs to determine multiple report configurations having an association relationship.

The association relationship among the multiple report configurations may be determined through one of RRC signaling, MAC-CE signaling, or DCI signaling. Alternatively, the multiple report configurations are associated with the same transmission parameter, where the transmission parameter includes at least one of the following: an association identifier (for example, each report configuration is associated with one association identifier index, and report configurations having the same index ID are determined to be associated), a triggering state, a time domain characteristic (related to periodic, aperiodic, and semi-persistent), a bandwidth part (BWP), a component carrier (CC), or a repetition parameter.

The multiple report configurations are associated with different control resource pool identifiers (CORESET Pool IDs).

The multiple report instances having the association relationship are in the same time domain unit configured by the second node or predefined.

The grouping criterion includes at least one of the following:

Reference signals in respective report instances from different report configurations are capable of being received simultaneously; or reference signals in the same report instance from the same report configuration are not capable of being received simultaneously.

Alternatively, the grouping criterion includes at least one of the following: reference signals in respective report instances from different report configurations are not capable of being received simultaneously; or reference signals in the same report instance from the same report configuration are capable of being received simultaneously.

The report instance includes at least grouping information and a reference signal.

For the grouping criterion, at least one of the following requirements needs to be satisfied: reference signals from different grouping information are capable of being received simultaneously; or reference signals from the same grouping information are not capable of being received simultaneously.

Alternatively, for the grouping criterion, at least one of the following requirements needs to be satisfied: reference signals from the same grouping information are capable of being received simultaneously; or reference signals from different grouping information are not capable of being received simultaneously.

Multiple report configurations or multiple report instances are grouped into one set, and multiple report instances within the set satisfy the grouping criterion.

Among multiple report configurations, one report configuration is configured with a specific identifier for representing a start identifier of the multiple report instances.

The base station end may specify for each report configuration the effective time of the report instance associated with the report configuration.

Alternatively, the UE end may indicate the effective time of the report instance to the base station end.

The UE end needs to feed back different or the same grouping information for the specified report configuration.

An SINR report and an RSRP report are associated with the beam grouping and the antenna grouping criterion, respectively, that is, when a user is configured to be the SINR report, the group based report is performed based on the beam grouping criterion; and when the user is configured to be the RSRP report, the group based report is performed based on the antenna grouping criterion.

The present application separately discusses the periodic CSI report, the semi-persistent CSI report, and the aperiodic CSI report.

In the periodic CSI report, two or more report configurations are associated, and in a given time unit, the UE end cannot associate the same grouping information (for example, a user antenna panel) with report instances corresponding to different report configurations.

The association is configured through the RRC signaling.

In the semi-persistent CSI report, two or more semi-persistent report configurations are associated, and in a given time unit, the UE end cannot associate the same grouping information (for example, a user antenna panel) with report instances corresponding to different report configurations.

The association is configured by activating MAC-CE signaling of the semi-persistent CSI report.

In the aperiodic CSI report, the UE end determines that multiple report configurations associated with the same triggering state are associated. The report configurations and the antenna panels of the UE end need to be in one-to-one correspondence from the perspective of the implementation at the UE end.

Figure 7:
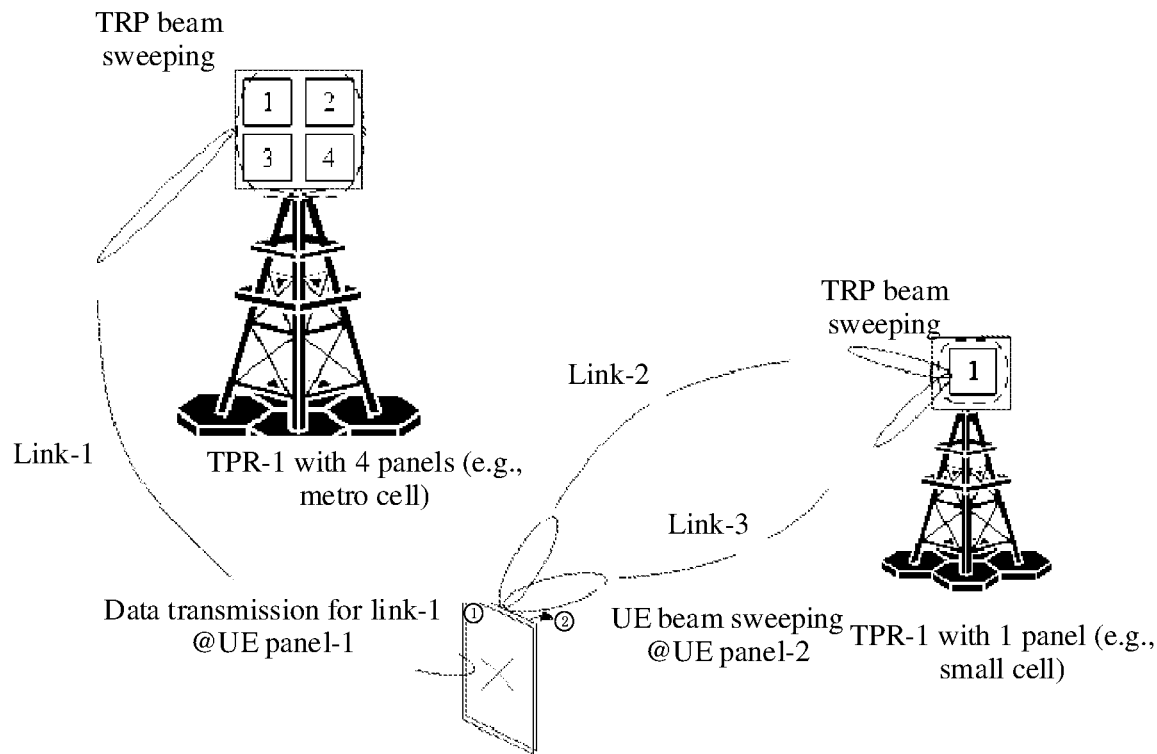
FIG. 7 is a schematic diagram of a reporting method under multiple report instances according to an embodiment of the present application.

FIG. 7 is a schematic diagram of a reporting method under multiple report instances according to the present application. As shown in FIG. 7, the base station end configures two report configurations to the UE end and associates these two report configurations, where report configuration a corresponds to a reference signal set under TRP-1, and report configuration b corresponds to a reference signal set under TRP-2. Therefore, the UE end selects a reference signal index and corresponding CSI (such as the RSRP or the SINR) under the reference signal set and provides the report instances separately for two TRPs. At the same time, the UE end needs to ensure that the reference signals under two report instances are capable of being received simultaneously. For example, for TRP-1, the UE end reports a reference signal index and corresponding CSI under Link-1; and for TRP-2, the UE end reports reference signal indices and corresponding CSI under Link-2 and Link-3, respectively. In this case, TRP-1 and TRP-2 may still effectively operate simultaneously in the non-ideal backhaul scenario.

In an embodiment, a reporting method based on the RSRP and the antenna grouping is provided.

The group based report needs to solve the problem that multiple base station beams need to be capable of being efficiently received simultaneously. In the group based report, for the acquisition of the channel state information (for example, the RSRP and the SINR), the impact on the reporting of the CSI caused by the exclusive use of UE-end resources by each simultaneously received reference signal and multiple simultaneously received reference signals therebetween needs to be considered.

A method for selecting a reference signal and determining channel state information by the UE end in various scenarios is analyzed.

In this embodiment, when the "RSRP report" and the "antenna grouping criterion" are configured, a method for determining the reference signal and the RSRP is described below. Under the antenna grouping criterion, reference signals within one group are not capable of being received simultaneously, and/or reference signals in different groups are capable of being received simultaneously.

It is assumed that, for a $k^{th}$ reference signal and an $l^{th}$ antenna panel at the UE end (that is, the grouping information), the UE end obtains the corresponding RSRP value P(k, l) through measurement. After the group based report is enabled, N groups are reported, and S reference signals are in each group, where the UE end supports up to $N_{max}$ groups (for example, the UE end supports $N_{max}$ antenna panels).

In step-1, N report groups are created, including N reference signal group sets $K_a$ and N pieces of grouping information $I_a$, where a=0, 1, . . . , N−1; and the parameter i is set to 0. In this case, the reference signal group set $K_a$ and the grouping information $I_a$ are both empty sets, that is, only the reference signal group sets are set, but there is no reference signal index in the sets, and the grouping information $I_a$ has no determined value.

In step-2, the best reference signal index $k_s$ and the best grouping information $l_s$ are determined from an RSRP set.

$$(k_s, l_s) = \underset{(k,l)}{\mathrm{argmax}} P(k, l)$$

In step-3, under the given grouping information $l_s$, the best S reference signals are determined in the manner described below.

$$s = 0$$
$$\text{while } (s \leq S - 1)\{$$
$$k = \underset{k}{\mathrm{argmax}} P(k, l_s);$$
$$P = P \backslash P(k, l_s);$$
$$K_i = K_i \cup k\}$$

In step-4, the S reference signals are determined to be a reference signal set $K_i$ under the $i^{th}$ group, and the best grouping information $l_s$ is determined to be grouping information $I_i$ under the $i^{th}$ group.

In step-5, when the parameter i is equal to N−1, the reference signal group set $K_a$ and the grouping information $I_a$ are outputted; otherwise, a relevant RSRP set P of the selected grouping information $l_s$ is removed, where P=P\P(:, $l_s$), so as to obtain the updated RSRP set; i is set to i+1, and then the method jumps to step-2.

'\' denotes that the element is removed. P\P(x, y) represents that an element P(x, y) is removed from the set P, that is, P(x, y) is set as P(x, y)=∅, meanwhile, values of the other elements in the set P and corresponding indices remain unchanged.

For example, when the "RSRP report" and the "antenna grouping criterion" are configured, contents of the group based report are described in Table 1. Considering that the grouping information in each group is the same, under a prescribed format, each group may report only one piece of grouping information. In addition, one piece of grouping information is reported for each reference signal index, and whether reference signals belong to the same group is determined according to the same grouping information.

TABLE 1

Antenna grouping report under the RSRP

| | Reference signal index | Grouping information (Antenna panel) | RSRP result |
|---|---|---|---|
| Group 0 | $K_0(0)$ | L(0) | $P(K_0(0), L(0))$ |
| | . . . | | |
| | $K_0(S - 1)$ | L(0) | $P(K_0(S - 1), L(0))$ |
| Group N − 1 | $K_{N-1}(0)$ | L(N − 1) | $P(K_{N-1}(0), L(N − 1))$ |
| | . . . | | |
| | $K_{N-1}(S - 1)$ | L(N − 1) | $P(K_{N-1}(S - 1), L(N − 1))$ |

In an embodiment, a reporting method based on the RSRP and the beam grouping is provided.

In this embodiment, when the "RSRP report" and the "beam grouping criterion" are configured, a method for determining the reference signal and the RSRP is described below. A difference from the preceding embodiment is that under the beam grouping criterion, reference signals within one group are capable of being received simultaneously, and/or reference signals in different groups are not capable of being received simultaneously.

It is assumed that, for the $k^{th}$ reference signal and the $l^{th}$ user antenna panel, the UE end obtains the corresponding RSRP value P(k, l) through measurement. After the group based report is enabled, N groups are reported and S reference signals are in each group, where the UE end supports up to $S_{max}$ reference signals (for example, the UE end supports $S_{max}$ antenna panels) in one group.

In step-1, N report groups are created, including reference signal group sets $K_a$ and antenna panel sets $L_a$, where a=0, 1, . . . , N−1, and the parameter i is set to 0.

In step-2, the best S user antenna panels are determined in sequence from an RSRP set in the manner described below.

$$P_{temp} = P$$
$$L = \emptyset$$
$$s = 0$$
$$\text{while } (s \leq S - 1)\{$$
$$(k_s, l_s) = \underset{(k,l)}{\mathrm{argmax}} P_{temp}(k, l);$$
$$P_{temp} = P_{temp} \backslash P_{temp}(:, l_s);$$
$$K_i = K_i \cup k_s$$
$$L = L \cup l_s\}$$

In step-3, the S reference signals are determined to be a reference signal set $K_i$ under the $i^{th}$ group, and the S user antenna panels are determined to be an antenna panel set $L_i$.

In step-4, when the parameter i is equal to N−1, the reference signal group set $K_a$ is outputted, where a=0, 1, . . . , N−1; otherwise, an element in the RSRP set associated with the selected S reference signals is removed to obtain the updated RSRP set.

$$s=0$$
$$\text{while}(s=S-1)\{$$
$$P=P\backslash P(K_i(s),L(s))\}$$
$$i=i+1$$

Then, the method jumps to step-2.

For the beam grouping, since from the base station end, the reference signals may be encoded in sequence in an order that the reference signals are grouped, the grouping information may not be reported.

In addition, when the reference signal groups are reported from different report instances, the UE end may still use the preceding algorithm for flexible TRP/report configuration and pair matching of UE-end antenna panels.

The base station end may specify a given antenna panel for the user to use to perform the corresponding beam selection. In this case, the UE end no longer needs a flow of determining the antenna panel.

For example, when the "RSRP report" and the "beam grouping criterion" are configured, contents of the group based report are described in Table 2. Similar to the "RSRP report" and the "antenna grouping criterion", the grouping information here does not need to report the associated antenna panel index at the UE end, but the antenna panel index is numbered in sequence, thereby serving a function of distinguishing the reference signal groups. In addition, a beam indication flow at the base station end is simplified (that is, the base station end may directly indicate one beam group, rather than indicating multiple reference signal indices under one group).

TABLE 2

Antenna grouping report under the RSRP

| | Reference signal index | Grouping information (Beam grouping) | RSRP result |
|---|---|---|---|
| Group 0 | $K_0(0)$ | 0 | $P(K_0(0), L(0))$ |
| | ... | | |
| | $K_0(S-1)$ | 0 | $P(K_0(S-1), L(0))$ |
| Group N − 1 | $K_{N-1}(0)$ | N − 1 | $P(K_{N-1}(0), L(N-1))$ |
| | ... | | |
| | $K_{N-1}(S-1)$ | N − 1 | $P(K_{N-1}(S-1), L(N-1))$ |

In an embodiment, a reporting method based on the SINR and the antenna grouping is provided.

Unlike the method of the RSRP, the SINR-based group based report of reference signals needs to consider interference between the reference signals and interference generated by other users under multi-user multiple-input and multiple-output (MU-MIMO). Therefore, under R(k, l) of the SINR, signal power under a given reference signal k and interference signal power (the received power of thermal noise and interference measurement resource (IMR) (including the NZP-CSI-RS and zero power-IMR) is considered here) under a UE-end receiving beam determined by the reference signals need to be considered.

Under the antenna grouping criterion, reference signals from different groups are capable of being received simultaneously, but reference signals from the same group are not capable of being received simultaneously. Therefore, the problem of mutual interference at a particular combination cannot be clarified in this case, only the SINR of a given reference signal is considered for simplification. The case is described below.

It is assumed that, for the $k^{th}$ reference signal and the $l^{th}$ antenna panel at the UE end (that is, the grouping information), the UE end obtains the corresponding signal-to-noise ratio R(k, l) through measurement. After the group based report is enabled, N groups are reported and S reference signals are in each group, where the UE end supports up to $N_{max}$ groups (for example, the UE end supports $N_{max}$ antenna panels).

In step-1, N report groups are created, including reference signal group sets $K_a$ and grouping information $I_a$, where a=0, 1, . . . , N−1; and the parameter i is set to 0.

In step-2, the best reference signal index $k_s$ and the best grouping information $l_s$ are determined from an SINR set.

$$(k_s, l_s) = \underset{(k,l)}{\mathrm{argmax}} R(k, l)$$

In step-3, under the given grouping information $l_s$, the best S reference signals are determined.

$$s = 0$$
$$\text{while } (s \leq S - 1)\{$$
$$k = \underset{k}{\mathrm{argmax}} R(k, l_s);$$
$$R = R \backslash R(k, l_s);$$
$$K_i = K_i \cup k\}$$

In step-4, the S reference signals are determined to be a reference signal set $K_i$ under the $i^{th}$ group, and the best grouping information is determined to be grouping information $I_i$ under the $i^{th}$ group.

In step-5, when the parameter i is equal to N−1, the reference signal group set $K_a$ and the grouping information $I_a$ are outputted; otherwise, a relevant SINR set R of the selected grouping information $l_s$ is removed, where R=R\R (:, $l_s$); i is set to i+1, and then the method jumps to step-2. The reference signal group set $K_a$ includes N reference signal sets $K_i$, and the grouping information $I_a$ includes N pieces of grouping information $I_i$.

For example, when the "SINR report" and the "antenna grouping criterion" are configured, contents of the group based report are described in Table 3. Similar to the antenna group report under the RSRP, the grouping information in each group is the same. Therefore, to save costs, under a prescribed format, each group may report only one piece of grouping information. In addition, one piece of grouping information is reported for each reference signal index, and it is determined whether reference signals belong to the same group according to the same grouping information.

TABLE 3

Antenna grouping report under the SINR

| | Reference signal index | Grouping information (Antenna panel) | SINR result |
|---|---|---|---|
| Group 0 | $K_0(0)$ | L(0) | $R(K_0(0), L(0))$ |
| | ... | | |
| | $K_0(S-1)$ | L(0) | $R(K_0(S-1), L(0))$ |

TABLE 3-continued

Antenna grouping report under the SINR

| | Reference signal index | Grouping information (Antenna panel) | SINR result |
|---|---|---|---|
| Group N − 1 | $K_{N-1}(0)$ | L(N − 1) | $R(K_{N-1}(0), L(N-1))$ |
| | ... | | |
| | $K_{N-1}(S-1)$ | L(N − 1) | $R(K_{N-1}(S-1), L(N-1))$ |

In an embodiment, a reporting method based on the SINR and the beam grouping under intra-group mutual interference is provided.

If the intra-group mutual interference is not considered, the reporting method under the beam grouping based on the SINR is basically similar to the corresponding method under the RSRP, except that the metric unit needs to be adjusted from the RSRP to the SINR. In this embodiment, a group based reporting method in the intra-group mutual interference scenario is mainly considered. For the beam grouping, reference signals within one group are capable of being received simultaneously, and/or reference signals in different groups are not capable of being received simultaneously. This means that one group is actually associated with one transmission mode in which multiple downlink beams are simultaneously transmitted. It is assumed that in the case where one beam corresponds to one data stream, other beams may interfere with this beam due to the simultaneous transmission of multiple beams. It can be seen that in the beam grouping scenario, for the mutual interference and the reference signals, the influence of the reference signals in the group needs to be considered.

Within the group, the SINR associated with the reference signal is determined by other reference signals in the group. The other reference signals in the group are used as interference and/or noise of the SINR associated with the reference signal. The implementation is described below. It is assumed that, for the $k^{th}$ reference signal and the $l^{th}$ user antenna panel at the UE end, the UE end obtains the corresponding signal power P(k, l) through measurement, and when the $m^{th}$ reference signal is received by a receiving beam determined by the $k^{th}$ reference signal and the $l^{th}$ user antenna panel, interference power is I(m; k, l). In addition, the background noise such as adjacent cell interference and thermal noise is n(k, l) under the $k^{th}$ reference signal and the $l^{th}$ user antenna panel. After the group based report is enabled, N groups are reported and S reference signals are in each group, where the UE end supports up to $S_{max}$ reference signals in one group (for example, the UE end supports $S_{max}$ antenna panels).

In step-1, N report groups are created, including reference signal group sets $K_a$ and antenna panel sets $L_a$, where a=0, 1, . . . , N−1; and i=0.

In step-2, combinations of reference signals and antenna panels of the maximum SINRs are selected in sequence from a signal power set, where once the combinations of reference signal and antenna panel are selected, these combinations are used as the subsequent noise part, and the best S user antenna panels are finally determined.

$P_{temp} = P$ $L_i = \emptyset$ $s = 0$ while ($s \leq S-1$){

$(k_s, l_s) = \underset{(k,l)}{\mathrm{argmax}} \frac{P_{temp}(k, l)}{n(k, l) + \sum_{m \in K_i} I(m; k, l)};$ $P_{temp} = P_{temp} \setminus P_{temp}(:, l_s);$ $K_i = K_i \cup k_s$ $L = L \cup l_s$}

In step-3, S reference signals are determined to be a reference signal set $K_i$ under the $i^{th}$ group, and user antenna panels having the top S SINRs are determined to be an antenna panel set $L_i$.

In step-4, when the parameter i is equal to N−1, the reference signal group set $K_a$ and corresponding UE-end antenna panel information $L_a$ are outputted, where a=0, 1, . . . , N−1; otherwise, the selected reference signals are removed.

s=0 while(s=S−1){

$P = P \setminus P(K_i(s), L_i(s))$} i=i+1

Then, the method jumps to step-2.

Similarly, for the beam grouping, since from the base station end, the reference signals may be encoded in sequence in an order that the reference signals are grouped, the grouping information may not be reported.

For example, when the "SINR report" and the "beam grouping criterion" are configured, contents of the group based report are described in Table 4. Although in a process of selecting the reference signal and the user antenna panel, the interference caused by a later selected reference signal to a previously selected reference signal is not considered, in the report, the interference caused by all other reference signals in the group to the previously selected reference signal still needs to be considered. For the $x^{th}$ group, the SINR result under the $y^{th}$ reference signal index is described below.

$$\frac{P(K_x(y), L_x(y))}{n(K_x(y), L_x(y)) + \sum_{m \in (K_x \setminus K_x(y))} I(m; K_x(y), L_x(y))}$$

$K_x(y)$ denotes a reference signal sent by the base station corresponding to the $y^{th}$ reference signal index in the $x^{th}$ group, $L_x(y)$ denotes a user antenna group corresponding to the $y^{th}$ reference signal index in the $x^{th}$ group, $P(K_x(y), L_x(y))$ denotes received signal power under $K_x(y)$ and $L_x(y)$, $n(K_x(y), L_x(y))$ denotes noise power under $K_x(y)$ and $L_x(y)$, $I(m; K_x(y), L_x(y))$ denotes received signal power of an $m^{th}$ reference signal received according to a receiving antenna panel and a receiving beam that are determined under $K_x(y)$ and $L_x(y)$, and $m \in (K_x \setminus K_x(y))$ denotes that m belongs to one of the remaining elements in a set $K_x$ except the element $K_x(y)$.

TABLE 4

Beam grouping report under the SINR

| | Reference signal index | Grouping information (Beam grouping) | SINR result |
|---|---|---|---|
| Group 0 | $K_0(0)$ | 0 | $\dfrac{P(K_0(0), L_0(0))}{n(K_0(0), L_0(0)) + \sum_{m \in (K_0 \backslash K_0(0))} I(m; K_0(0), L_0(0))}$ |
| | ... | | |
| | $K_0(S-1)$ | 0 | $\dfrac{P(K_0(S-1), L(S-1))}{n(K_0(S-1), L(S-1)) + \sum_{m \in (K_0 \backslash K_0(S-1))} I(m; K_0(S-1), L(S-1))}$ |
| Group $N-1$ | $K_{N-1}(0)$ | $N-1$ | $\dfrac{P(K_{N-1}(0), L_{N-1}(0))}{n(K_{N-1}(0), L_{N-1}(0)) + \sum_{m \in (K_{N-1} \backslash K_{N-1}(0))} I(m; K_{N-1}(0), L_{N-1}(0))}$ |
| | ... | | |
| | $K_{N-1}(S-1)$ | $N-1$ | $\dfrac{P(K_{N-1}(S-1), L_{N-1}(S-1))}{n(K_{N-1}(S-1), L_{N-1}(S-1)) + \sum_{m \in (K_{N-1} \backslash K_{N-1}(S-1))} I(m; K_{N-1}(S-1), L_{N-1}(S-1))}$ |

In an embodiment, the case of the group based report in a low-frequency band (sub-6 GHz) scenario is provided.

In the low-frequency band (sub-6 GHz) new radio (NR) scenario, downlink multi-beam transmission is very important for the ultra reliable low latency communications (URLLC) scenario and the high-speed railway scenario, and the stability of the whole link can be improved through the multi-beam diversity gain. In this scenario, the group based report can still effectively assist the base station end to quickly select the optimal transmission beam combination by reporting multiple simultaneously received beam pairs (for example, with the SINR considering the intra-group interference, the UE end performs receiving-end digital beamforming under multiple receiving antennas, which is similar to an above-6 GHz scenario).

Figure 8:
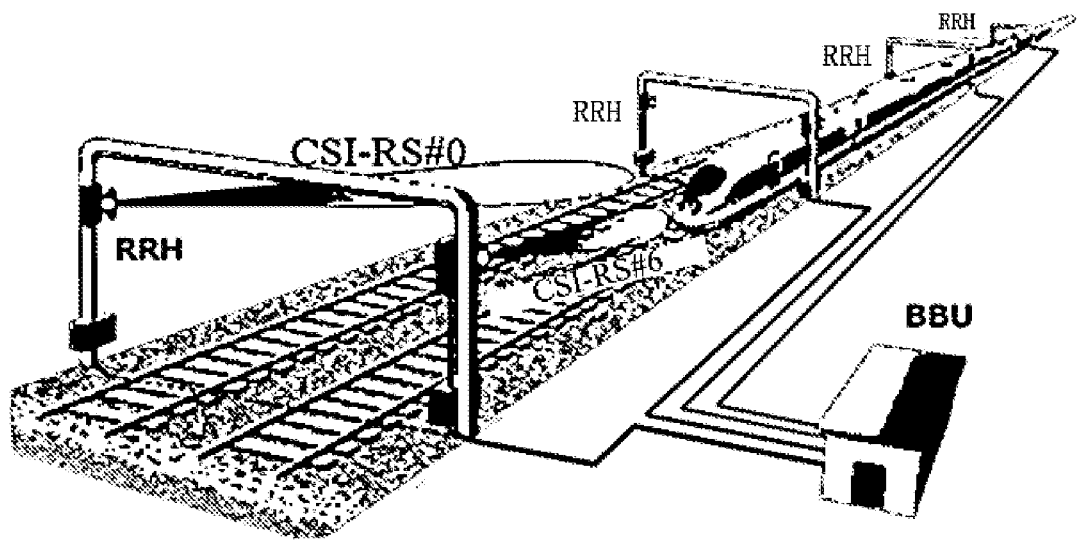
FIG. 8 is a schematic diagram of a reporting method under multiple report instances according to an embodiment of the present application.

FIG. 8 is a schematic diagram of a reporting method under multiple report instances according to an embodiment of the present application. The base station end configures two reference signal sets for two remote radio heads (RRHs), respectively. The two reference signal sets are reference signal set A {CSI-RS#0, CSI-RS#1, CSI-RS#2, CSI-RS#3} and reference signal set B {CSI-RS#4, CSI-RS#5, CSI-RS#6, CSI-RS#7}. The UE end needs to select two reference signals from different reference signal sets. For example, CSI-RS #0 and CSI-RS #6 form one group, where for the calculation of the SINR, other reference signals within the group are used as interference reference signals, and SINR results under the two reference signals are separately outputted. After receiving the two reference signals, the base station end configures respective tracking reference signals (TRSs) corresponding to the two reference signals for real-time time-domain and frequency-domain tracking at the UE end.

To sum up, according to channel quality measurement and other measurement information (for example, the detection of a human body direction by a camera) at the UE end, the fed back power parameter and CSI, the influence of maximum permissive exposure (MPE) fed back directly or indirectly to the base station end, and an index of an uplink beam under consideration of the MPE effectively assist the decision-making of the base station end for the uplink beam scheduling of the reference signal and the subsequent uplink channel, thereby improving the system performance.

Figure 9:
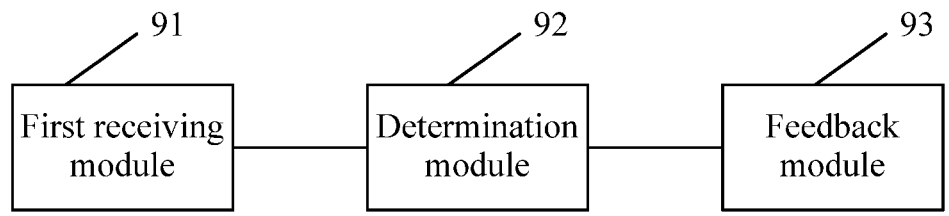
FIG. 9 is a structural diagram of an information feedback apparatus according to an embodiment of the present application.

In an embodiment, an embodiment of the present application provides an information feedback apparatus configured in a first node. As shown in FIG. 9, the information feedback apparatus provided in this embodiment includes a first receiving module 91, a determination module 92, and a feedback module 93.

The first receiving module 91 is configured to receive a report configuration sent by a second node. The determination module 92 is configured to determine channel state information according to the report configuration, where the channel state information includes a reference signal, and the reference signal satisfies a grouping criterion associated with the report configuration. The feedback module 93 is configured to feed back the channel state information to the second node through a report instance.

In an example embodiment, the channel state information further includes one or more of the following: grouping information, a reference signal receiving power (RSRP), or a signal to interference plus noise ratio (SINR).

In an example embodiment, multiple report configurations have an association relationship, or multiple report instances have an association relationship.

In an example embodiment, the association relationship between the multiple report configurations or the association relationship between the multiple report instances is determined through at least one of the following signaling: RRC signaling, MAC-CE signaling, or DCI signaling.

In an example embodiment, the multiple report configurations are associated with the same transmission parameter, where the transmission parameter includes one or more of the following: an association identifier, a triggering state, a time domain characteristic, a bandwidth part (BWP), a component carrier (CC), or a repetition parameter.

In an example embodiment, the multiple report configurations are associated with different control resource pool identifiers.

In an example embodiment, the multiple report instances having the association relationship are in the same time domain unit configured by the second node or predefined.

In an example embodiment, reference signals in multiple report instances constitute one or more groups, and the multiple report instances satisfy the grouping criterion.

In an example embodiment, the grouping criterion includes one or more of the following: reference signals in respective report instances from different report configurations are capable of being received simultaneously; or reference signals in the same report instance from the same report configuration are not capable of being received simultaneously.

In an example embodiment, the grouping criterion includes one or more of the following: reference signals in respective report instances from different report configurations are not capable of being received simultaneously; or reference signals in the same report instance from the same report configuration are capable of being received simultaneously.

In an example embodiment, the grouping criterion includes one or more of the following: a beam grouping criterion or an antenna grouping criterion.

In an example embodiment, in the case where the channel state information includes the SINR, the reference signal satisfies the beam grouping criterion; or in the case where the channel state information includes the RSRP, the reference signal satisfies the antenna grouping criterion.

In an example embodiment, the antenna grouping criterion includes one or more of the following: reference signals within one group are not capable of being received simultaneously; reference signals in different groups are capable of being received simultaneously; reference signals within one group are not capable of being sent simultaneously; or reference signals in different groups are capable of being sent simultaneously.

In an example embodiment, the beam grouping criterion includes one or more of the following: reference signals within one group are capable of being received simultaneously; reference signals in different groups are not capable of being received simultaneously; reference signals within one group are capable of being sent simultaneously; or reference signals in different groups are not capable of being sent simultaneously.

In an example embodiment, among multiple report configurations, one of the multiple report configurations is configured with a specific identifier for indicating that the report instance corresponding to the one report configuration is the leading report instance among multiple report instances.

In an example embodiment, a corresponding time identifier is configured in each of the multiple report configurations and used for indicating an effective time of the report instance corresponding to the report configuration; or each of the multiple report instances carries time indication information used for indicating an effective time of the report instance and determined by the first node.

In an example embodiment, the report configuration carries grouping information, and grouping information corresponding to the report instance is the same as the grouping information carried in the report configuration.

In an example embodiment, the report configuration carries grouping information, and grouping information corresponding to the report instance needs to be different from the grouping information carried in the report configuration.

In an example embodiment, a method for determining the channel state information includes the following:

N groups are created and the parameter i is set to 0; one or more of the following information for an $i^{th}$ group is determined from a channel state set: a reference signal set $K_i$, grouping information $I_i$, or an antenna panel set $L_i$; if the parameter i is less than N−1, an element in the channel state set associated with the grouping information $I_i$ or the antenna panel set $L_i$ is removed to obtain the updated channel state set, i is set to i+1, and the method returns to executing that one or more of the following information for the $i^{th}$ group is determined from the channel state set: the reference signal set $K_i$, the grouping information $I_i$, or the antenna panel set $L_i$; and if the parameter i is equal to N−1, the N groups are outputted.

In an example embodiment, when the report configuration includes the feedback using the RSRP and the antenna grouping criterion, a method for determining the channel state information includes the following:

N groups are created and the parameter i is set to 0; the best reference signal and best grouping information are determined from an RSRP set; reference signals having the top S RSRPs are determined under the best grouping information; the S reference signals are determined to be a reference signal set $K_i$ for an $i^{th}$ group and the best grouping information is determined to be grouping information $I_i$ for the $i^{th}$ group; if the parameter i is less than N−1, an element in the RSRP set associated with the best grouping information is removed to obtain the updated RSRP set, i is set to i+1, and the method returns to executing that the best reference signal and the best grouping information are determined from the RSRP set; and if the parameter i is equal to N−1, the N groups are outputted.

In an example embodiment, when the report configuration includes the feedback using the RSRP and the beam grouping criterion, a method for determining the CSI includes the following:

N groups are created and the parameter i is set to 0; user antenna panels having the top S RSRPs and reference signals having the top S RSRPs are determined from an RSRP set; the S reference signals are determined to be a reference signal set $K_i$ for an $i^{th}$ group and the S user antenna panels are determined to be an antenna panel set $L_i$; if the parameter i is less than N−1, an element in the RSRP set associated with the S reference signals and the S user antenna panels is removed to obtain the updated RSRP set, i is set to i+1, and the method returns to executing that the user antenna panels having the top S RSRPs and the reference signals having the top S RSRPs are determined from the RSRP set; and if the parameter i is equal to N−1, the N groups are outputted.

In an example embodiment, when the report configuration includes the feedback using the SINR and the antenna grouping criterion, a method for determining the reference signal in the report instance includes the following:

N groups are created and the parameter i is set to 0; the best reference signal and best grouping information are determined from an SINR set; reference signals having the top S SINRs are determined under the best grouping information; the S reference signals are determined to be a reference signal set $K_i$ for an $i^{th}$ group and the best grouping information is determined to be grouping information $I_i$ for the $i^{th}$ group; if the parameter i is less than N−1, an element in the SINR set associated with the best grouping information is removed to obtain the updated SINR set, i is set to i+1, and the method returns to executing that the best reference signal and the best grouping information are determined from the SINR set; and if the parameter i is equal to N−1, the N groups are outputted.

In an example embodiment, when the report configuration includes the feedback using the SINR and the beam grouping criterion, a method for determining the reference signal in the report instance includes the following:

N groups are created and the parameter i is set to 0; combinations of reference signals and antenna panels of best SINRs are selected in sequence from an SINR set; the selected combinations of reference signals and antenna panels are used as a noise part and reference signals having the top S SINRs and user antenna panels having the top S SINRs are determined; the S reference signals are determined to be a reference signal set $K_i$ for an $i^{th}$ group and the user antenna panels having the top S SINRs are determined to be an antenna panel set $L_i$; if the parameter i is less than N−1, an SINR set associated with the S reference signals and the S user antenna panels is removed to obtain the updated SINR set, i is set to i+1, and the method returns to executing that the combinations of reference signals and antenna panels of best SINRs are selected in sequence from the SINR set; and if the parameter i is equal to N−1, the N groups are outputted.

In an example embodiment, within one beam group, an SINR associated with the reference signal is determined by other reference signals within the one beam group.

In an example embodiment, the SINR associated with the reference signal is determined by the other reference signals within the one beam group in the manner of determining the other reference signals in the beam group to be interference and/or noise of the SINR associated with the reference signal.

In an example embodiment, an SINR corresponding to a $y^{th}$ reference signal in an $x^{th}$ group is represented by the formula described below.

$$\frac{P(K_x(y), L_x(y))}{n(K_x(y), L_x(y)) + \sum_{m \in (K_x \setminus K_x(y))} I(m; K_x(y), L_x(y))}$$

$K_x(y)$ denotes a reference signal sent by the second node corresponding to the $y^{th}$ reference signal index in the $x^{th}$ group, $L_x(y)$ denotes an antenna group of the first node corresponding to the $y^{th}$ reference signal index in the $x^{th}$ group, $P(K_x(y), L_x(y))$ denotes received signal power under $K_x(y)$ and $L_x(y)$, $n(K_x(y), L_x(y))$ denotes noise power under $K_x(y)$ and $L_x(y)$, $I(m; K_x(y), L_x(y))$ denotes received signal power of an $m^{th}$ reference signal received according to a receiving antenna panel and a receiving beam that are determined under $K_x(y)$ and $L_x(y)$, and $m \in (K_x \setminus K_x(y))$ denotes that m belongs to one of the remaining elements in a set $K_x$ except the element $K_x(y)$.

In an example embodiment, information feedback includes one or more of the following: a periodic CSI report, a semi-persistent CSI report, or an aperiodic CSI report.

In an example embodiment, in the case where the information feedback is the periodic CSI report or the semi-persistent CSI report, within one preset time unit, the first node is prohibited from associating the same grouping information with report instances corresponding to different report configurations. An association relationship of report configurations in the periodic CSI report is configured through RRC signaling, or an association relationship of report configurations in the semi-persistent CSI report is configured through MAC-CE signaling.

In an example embodiment, multiple report configurations having an association relationship are determined in the manner of determining, in the aperiodic CSI report, that the multiple report configurations associated with the same triggering state or the same trigger signaling have the association relationship.

The information feedback apparatus provided in the embodiment may perform the information feedback method provided in any embodiment of the present application and has function modules and effects corresponding to the performed method. For technical details not described in detail in the embodiment, reference may be made to the information feedback method provided in any embodiment of the present application.

Units and modules included in the embodiment of the information feedback apparatus are just divided according to functional logic, but the present application is not limited to this division as long as the corresponding functions can be implemented. Additionally, the names of function units are just used to distinguish between each other and are not intended to limit the scope of the present application.

Figure 10:
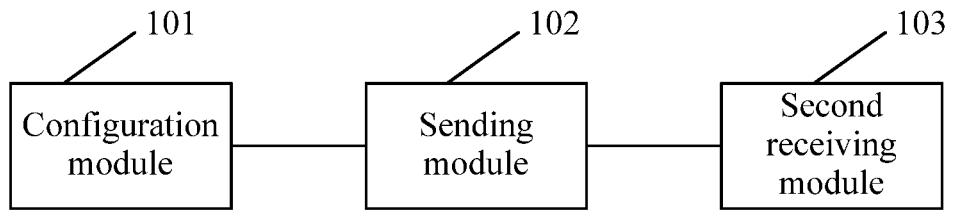
FIG. 10 is a structural diagram of an information receiving apparatus according to an embodiment of the present application.

In an embodiment, an embodiment of the present application provides an information receiving apparatus configured in a second node. As shown in FIG. 10, the information receiving apparatus provided in this embodiment includes a configuration module 101, a sending module 102, and a second receiving module 103.

The configuration module 101 is configured to configure a report configuration. The sending module 102 is configured such that a first node determines channel state information according to the report configuration, where the channel state information includes a reference signal, and the reference signal satisfies a grouping criterion associated with the report configuration. The second receiving module 103 is configured to receive the channel state information fed back by the first node through a report instance.

In an example embodiment, the channel state information further includes one or more of the following: grouping information, reference signal receiving power (RSRP), or a signal to interference plus noise ratio (SINR).

In an example embodiment, multiple report configurations have an association relationship, or multiple report instances have an association relationship.

In an example embodiment, the association relationship between the multiple report configurations or the association relationship between the multiple report instances is determined through at least one of the following signaling: RRC signaling, media access control-control element (MAC-CE) signaling, or downlink control information (DCI) signaling.

In an example embodiment, the multiple report configurations are associated with the same transmission parameter.

The transmission parameter includes one or more of the following: an association identifier, a triggering state, a time domain characteristic, a bandwidth part (BWP), a component carrier (CC), or a repetition parameter.

In an example embodiment, the multiple report configurations are associated with different control resource pool identifiers.

In an example embodiment, multiple report instances having the association relationship are in the same time domain unit configured by the second node or predefined.

In an example embodiment, reference signals in e multiple report instances constitute one or more groups, and the multiple report instances satisfy the grouping criterion.

In an example embodiment, the grouping criterion includes one or more of the following: reference signals in respective report instances from different report configurations are capable of being received simultaneously; or reference signals in the same report instance from the same report configuration are not capable of being received simultaneously.

In an example embodiment, the grouping criterion includes one or more of the following: reference signals in respective report instances from different report configurations are not capable of being received simultaneously; or reference signals in the same report instance from the same report configuration are capable of being received simultaneously.

In an example embodiment, the grouping criterion includes one or more of the following: a beam grouping criterion or an antenna grouping criterion.

In an example embodiment, in the case where the channel state information includes the SINR, the reference signal satisfies the beam grouping criterion; or in the case where the channel state information includes the RSRP, the reference signal satisfies the antenna grouping criterion.

In an example embodiment, the antenna grouping criterion includes one or more of the following: reference signals within one group are not capable of being received simultaneously; reference signals in different groups are capable of being received simultaneously; reference signals within one group are not capable of being sent simultaneously; or reference signals in different groups are capable of being sent simultaneously.

In an example embodiment, the beam grouping criterion includes one or more of the following: reference signals within one group are capable of being received simultaneously; reference signals in different groups are not capable of being received simultaneously; reference signals within one group are capable of being sent simultaneously; or reference signals in different groups are not capable of being sent simultaneously.

In an example embodiment, among multiple report configurations, one of the multiple report configurations is configured with a specific identifier for indicating that the report instance corresponding to the one report configuration is the leading report instance among multiple report instances.

In an example embodiment, a corresponding time identifier is configured in each of the multiple report configurations and used for indicating an effective time of the report instance corresponding to the report configuration; or each of the multiple report instances carries time indication information used for indicating an effective time of the report instance and determined by the first node.

In an example embodiment, the report configuration carries grouping information, and grouping information corresponding to the report instance is the same as the grouping information carried in the report configuration.

In an example embodiment, the report configuration carries grouping information, and grouping information corresponding to the report instance needs to be different from the grouping information carried in the report configuration.

In an example embodiment, a method for determining the channel state information includes the following:

N groups are created and the parameter i is set to 0; one or more of the following information for an $i^{th}$ group is determined from a channel state set: a reference signal set $K_i$, grouping information $I_i$, or an antenna panel set $L_i$; if the parameter i is less than N−1, an element in the channel state set associated with the grouping information $I_i$ or with the antenna panel set $L_i$ is removed to obtain the updated channel state set, i is set to i+1, and the method returns to executing that one or more of the following information for the $i^{th}$ group is determined from the channel state set: the reference signal set $K_i$, the grouping information $I_i$, or the antenna panel set $L_i$; and if the parameter i is equal to N−1, the N groups are outputted.

In an example embodiment, in the case where the report configuration includes the feedback using the RSRP and the antenna grouping criterion, a method for determining the channel state information includes the following:

N groups are created and the parameter i is set to 0; the best reference signal and best grouping information are determined from an RSRP set; reference signals having the top S RSRPs are determined under the best grouping information; the S reference signals are determined to be a reference signal set $K_i$ for an $i^{th}$ group and the best grouping information is determined to be grouping information $I_i$ for the $i^{th}$ group; if the parameter i is less than N−1, an element in the RSRP set associated with the best grouping information is removed to obtain the updated RSRP set, i is set to i+1, and the best reference signal and the best grouping information are determined from the RSRP set; and if the parameter i is equal to N−1, the N groups are outputted.

In an example embodiment, when the report configuration includes the feedback using the RSRP and the beam grouping criterion, a method for determining the channel state information includes the following:

N groups are created and the parameter i is set to 0; user antenna panels having the top S RSRPs and reference signals having the top S RSRPs are determined from an RSRP set; the S reference signals are determined to be a reference signal set $K_i$ for an $i^{th}$ group and the S user antenna panels are determined to be an antenna panel set $L_i$; if the parameter i is less than N−1, an element in an RSRP set associated with the S reference signals and the S user antenna panels is removed to obtain the updated RSRP set, i is set to i+1, and the method returns to executing that the S user antenna panels having the top S RSRPs and the reference signals having the top S RSRPs are determined from the RSRP set; and if the parameter i is equal to N−1, the N groups are outputted.

In an example embodiment, when the report configuration includes the feedback using the SINR and the antenna grouping criterion, a method for determining the reference signal in the report instance includes the following:

N groups are created and the parameter i is set to 0; the best reference signal and best grouping information are determined from an SINR set; reference signals having the top S SINRs are determined under the best grouping information; the S reference signals are determined to be a reference signal set $K_i$ for an $i^{th}$ group and the best grouping information is determined to be grouping information $I_i$ for the $i^{th}$ group; if the parameter i is less than N−1, an element in the SINR set associated with the best grouping information is removed to obtain the updated SINR set, i is set to i+1, and the method returns to executing that the best reference signal and the best grouping information are determined from the SINR set; and if the parameter i is equal to N−1, the N groups are outputted.

In an example embodiment, in the case where the report configuration includes the feedback using the SINR and the beam grouping criterion, a method for determining the reference signal in the report instance includes the following:

N groups are created and the parameter i is set to 0; combinations of reference signals and antenna panels of best SINRs are selected in sequence from an SINR set; the selected combinations of reference signals and antenna panels are used as a noise part and reference signals having the top S SINRs and user antenna panels having the top S SINRs are determined; the S reference signals are determined to be a reference signal set $K_i$ for an $i^{th}$ group and the first S user antenna panels of the SINR are determined to be an antenna panel set $L_i$; if the parameter i is less than N−1, an SINR set associated with the S reference signals and the S user antenna panels is removed to obtain the updated SINR set, i is set to i+1, and the method returns to executing that the combinations of reference signals and antenna panels of the best SINRs are selected in sequence from the SINR set; and if the parameter i is equal to N−1, the N groups are outputted.

In an example embodiment, within one beam group, an SINR associated with the reference signal is determined by other reference signals within the one beam group.

In an example embodiment, the SINR associated with the reference signal is determined by the other reference signals within the one beam group in the manner of determining the other reference signals in the beam group to be interference and/or noise of the SINR associated with the reference signal.

In an example embodiment, an SINR corresponding to a $y^{th}$ reference signal in an $x^{th}$ group is represented by the formula described below.

$$\frac{P(K_x(y), L_x(y))}{n(K_x(y), L_x(y)) + \sum_{m \in (K_x \backslash K_x(y))} I(m; K_x(y), L_x(y))}$$

$K_x(y)$ denotes a reference signal sent by the second node corresponding to the $y^{th}$ reference signal index in the $x^{th}$ group, $L_x(y)$ denotes an antenna group of the first node corresponding to the $y^{th}$ reference signal index in the $x^{th}$ group, $P(K_x(y), L_x(y))$ denotes received signal power under $K_x(y)$ and $L_x(y)$, $n(K_x(y), L_x(y))$ denotes noise power under $K_x(y)$ and $L_x(y)$, $I(m; K_x(y), L_x(y))$ denotes received signal power of an $m^{th}$ reference signal received according to a receiving antenna panel and a receiving beam that are determined under $K_x(y)$ and $L_x(y)$, and $m \in (K_x \backslash K_x (y))$ denotes that m belongs to one of the remaining elements in a set $K_x$ except the element $K_x(y)$.

In an example embodiment, information feedback includes one or more of the following: a periodic CSI report, a semi-persistent CSI report, or an aperiodic CSI report.

In an example embodiment, in the case where the information feedback is the periodic CSI report or the semi-persistent CSI report, within one preset time unit, the first node is prohibited from associating the same grouping information with report instances corresponding to different report configurations. An association relationship of report configurations in the periodic CSI report is configured through RRC signaling, or an association relationship of report configurations in the semi-persistent CSI report is configured through MAC-CE signaling.

In an example embodiment, multiple report configurations having an association relationship are determined in the manner of determining, in the aperiodic CSI report, that multiple report configurations associated with the same triggering state or the same trigger signaling have the association relationship.

The information receiving apparatus provided in the embodiment may perform the information receiving method provided in any embodiment of the present application and has function modules and effects corresponding to the performed method. For technical details not described in detail in the embodiment, reference may be made to the information receiving method provided in any embodiment of the present application.

Units and modules included in the embodiment of the information receiving apparatus are just divided according to functional logic, but the present application is not limited to this division as long as the corresponding functions can be implemented. Additionally, the names of function units are just used to distinguish between each other and are not intended to limit the scope of the present application.

Figure 11:
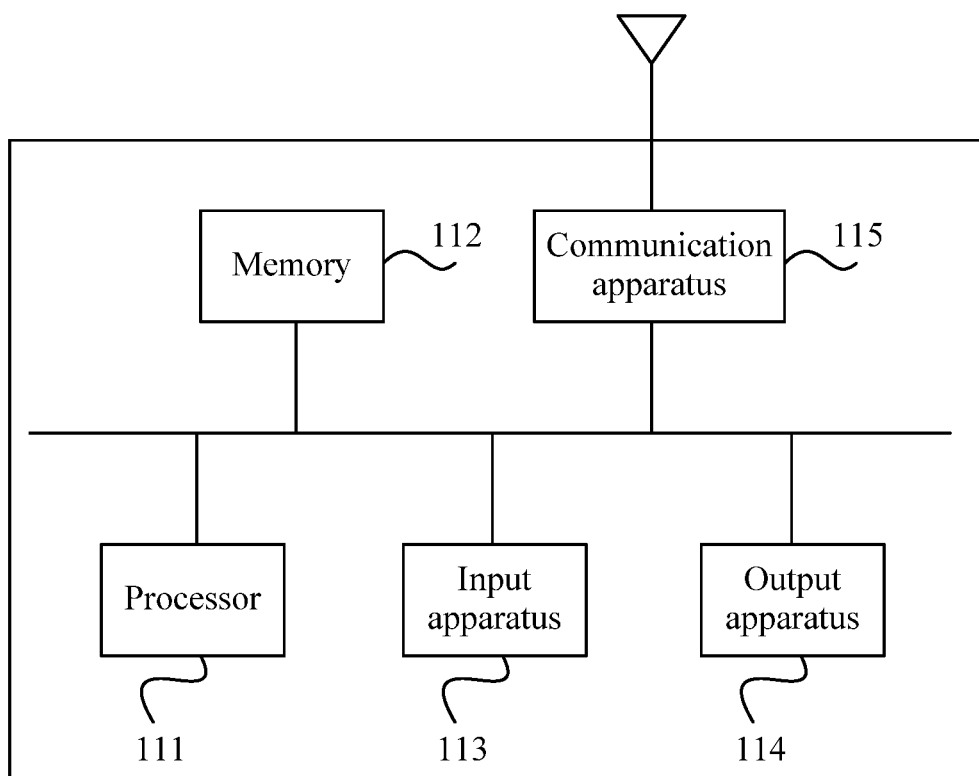
FIG. 11 is a structural diagram of a device according to an embodiment of the present application.

An embodiment of the present application further provides a device. FIG. 11 is a structural diagram of a device according to an embodiment of the present application. As shown in FIG. 11, the device includes a processor 111, a memory 112, an input apparatus 113, an output apparatus 114, and a communication apparatus 115. One or more processors 111 may be provided in the device. One processor 111 is used as an example in FIG. 11. The processor 111, the memory 112, the input apparatus 113, and the output apparatus 114 in the device may be connected through a bus or in other manners. In FIG. 11, connection through a bus is performed by way of example.

As a computer-readable storage medium, the memory 112 is used for storing software programs, computer-executable programs, and modules. The processor 111 executes software programs, instructions, and modules stored in the memory 112 to perform various function applications and data processing of the device, that is, to implement any method provided by an embodiment of the present application.

The memory 112 may mainly include a program storage region and a data storage region, where the program storage region may store an operating system and an application program required by at least one function while the data storage region may store data created depending on use of a device. Additionally, the memory 112 may include a high-speed random-access memory and may further include a non-volatile memory, for example, at least one magnetic disk memory, a flash memory, or another non-volatile solid-state memory. In some examples, the memory 112 may include memories which are remotely disposed relative to the processor 111, and these remote memories may be connected to the device via a network. Examples of the preceding network include, but are not limited to, the Internet, an intranet, a local area network, a mobile communication network and a combination thereof.

The input apparatus 113 may be configured to receive inputted digital or character information and generate key signal input related to the user setting and function control of the device. The output apparatus 114 may include a display device such as a display screen.

The communication apparatus 115 may include a receiver and a sender. The communication apparatus 115 is configured to perform information transceiving communication under the control of the processor 111.

In an embodiment, an embodiment of the present application further provides a storage medium including computer-executable instructions, where the computer-executable instructions, when executed by a computer processor, cause the computer processor to perform an information feedback method applied to a first node. The information feedback method includes receiving a report config sent by a second node; determining channel state information according to the report configuration, where the channel state information includes a reference signal, and the reference signal satisfies a grouping criterion associated with the report configuration; and feeding back the channel state information to the second node through a report instance.

As for the storage medium including the computer-executable instruction, which is provided in the embodiment of the present application, the computer-executable instruction may implement not only the operation in the preceding method but also the related operations in the information feedback method provided in any embodiment of the present application.

In an example embodiment, an embodiment of the present application further provides a storage medium including computer-executable instructions, where the computer-executable instructions, when executed by a computer processor, cause the computer processor to perform an information receiving method applied to a second node. The information receiving method includes configuring a report configuration; sending the report configuration to a first node, so that the first node determines channel state information according to the report configuration, where the channel state information includes a reference signal, and the reference signal satisfies a grouping criterion associated with the report configuration; and receiving the channel state information fed back by the first node through a report instance.

As for the storage medium including the computer-executable instruction, which is provided in the embodiment of the present application, the computer-executable instruction may implement not only the operation in the preceding method but also the related operations in the information receiving method provided in any embodiment of the present application.

From the preceding description of the embodiments, the present application may be implemented by means of both software and required general-purpose hardware, and also by means of hardware. The technical solutions of the present application may be substantially embodied in the form of a software product. The software product in a computer may be stored in a computer-readable storage medium such as a floppy disk, a read-only memory (ROM), a random-access memory (RAM), a flash memory, a hard disk, or an optical disk in the computer and includes instructions for enabling a computer device (which may be a personal computer, a server, or a network device) to perform the method in the embodiments of the present application.

The term user terminal encompasses any appropriate type of wireless user devices such as a mobile phone, a portable data processing apparatus, a portable web browser or a vehicle-mounted mobile station.

Generally speaking, various embodiments of the present application may be implemented in hardware or special-purpose circuits, software, logic or any combination thereof. For example, some aspects may be implemented in hardware while other aspects may be implemented in firmware or software executable by a controller, a microprocessor or another calculation apparatus, though the present application is not limited thereto.

Embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in the memory. The memory may be of any type suitable for a local technical environment and may be implemented using any suitable data storage technology, for example, but not limited to, a read-only memory (ROM), a random-access memory (RAM), and an optical memory device and system (a digital video disc (DVD) or a compact disk (CD)). Computer-readable media may include non-transitory storage media. The data processor may be of any type suitable for the local technical environment such as, but not limited to, a general-purpose computer, a special-purpose computer, a microprocessor, a digital signal processing (DSP), an application-specific integrated circuit (ASIC), a field-programmable gate array (FPGA), and a processor based on multi-core processor architecture.

We claim:

1. An information feedback method, applied to a first node, comprising:

receiving a report configuration sent by a second node;

determining channel state information according to the report configuration, wherein the channel state information comprises a reference signal, and the reference signal satisfies a grouping criterion associated with the report configuration; and feeding the channel state information back to the second node through a report instance;

wherein the channel state information further comprises at least one of grouping information, a reference signal receiving power (RSRP), or a signal to interference plus noise ratio (SINR);

wherein in a case where the report configuration comprises a feedback using the RSRP and a beam grouping criterion, the determining the channel state information comprises:

creating N groups and setting an integer parameter i to 0, wherein N is an integer greater than or equal to 1;

determining, from an RSRP set, user antenna panels having top S RSRPs and reference signals having the top S RSRPs, where S is an integer;

determining the reference signals having the top S RSRPs to be an $i^{th}$ reference signal set, denoted as Ki, under an $i^{th}$ group, and determining the user antenna panels having the top S RSRPs to be an $i^{th}$ antenna panel set, denoted as Li;

in a case where the parameter i is less than N−1, removing an element in the RSRP set that is associated with the reference signals having the top S RSRPs and with the user antenna panels having the top S RSRPs to obtain an updated RSRP set; setting i to i+1, and returning to execution of determining, from the RSRP set, the user antenna panels having the top S RSRPs and the reference signals having the top S RSRPs; and in a case where the parameter i is equal to N−1, outputting the N groups.

2. The method of claim 1, wherein the grouping criterion comprises at least one of:

reference signals in different report instances from different report configurations are capable of being received simultaneously; or reference signals in a same report instance from a same report configuration are not capable of being received simultaneously.

3. The method of claim 1, wherein the grouping criterion comprises at least one of:
reference signals in different report instances from different report configurations are not capable of being received simultaneously; or
reference signals in a same report instance from a same report configuration are capable of being received simultaneously.

4. The method of claim 1, wherein the grouping criterion comprises at least one of: a beam grouping criterion or an antenna grouping criterion.

5. The method of claim 4, wherein the antenna grouping criterion comprises at least one of:
reference signals within one group are not capable of being received simultaneously;
reference signals in different groups are capable of being received simultaneously;
reference signals within one group are not capable of being sent simultaneously; or
reference signals in different groups are capable of being sent simultaneously.

6. The method of claim 4, wherein the beam grouping criterion comprises at least one of:
reference signals within one group are capable of being received simultaneously;
reference signals in different groups are not capable of being received simultaneously;
reference signals within one group are capable of being sent simultaneously; or
reference signals in different groups are not capable of being sent simultaneously.

7. The method of claim 1, wherein among a plurality of report configurations, one of the plurality of report configurations is configured with a specific identifier, and the specific identifier is used for indicating that a report instance corresponding to the one of the plurality of report configurations is a leading report instance among a plurality of report instances.

8. The method of claim 1, wherein among a plurality of report configurations, a corresponding time identifier is configured in each of the plurality of report configurations, and the time identifier is used for indicating an effective time of a report instance corresponding to each of the plurality of report configurations; or
among a plurality of report instances, each of the plurality of report instances carries time indication information, the time indication information is used for indicating an effective time of each of the plurality of report instances, and the time indication information is determined by the first node.

9. The method of claim 1, wherein the report configuration carries grouping information, and grouping information corresponding to the report instance needs to be same as the grouping information carried in the report configuration.

10. The method of claim 1, wherein the report configuration carries grouping information, and grouping information corresponding to the report instance needs to be different from the grouping information carried in the report configuration.

11. The method of claim 1, wherein an information feedback comprises at least one of:
a periodic channel state information (CSI) report, a semi-persistent CSI report, or an aperiodic CSI report.

12. The method of claim 11, wherein determining a plurality of report configurations having an association relationship comprises:
determining, in the aperiodic CSI report, that the plurality of report configurations associated with a same triggering state or with same trigger signaling have the association relationship.

13. An information receiving method, applied to a second node, comprising:
configuring a report configuration;
sending the report configuration to a first node, such that the first node determines channel state information according to the report configuration, wherein the channel state information comprises a reference signal, and the reference signal satisfies a grouping criterion associated with the report configuration; and
receiving the channel state information fed back by the first node through a report instance;
wherein the channel state information further comprises at least one of grouping information, a reference signal receiving power (RSRP), or a signal to interference plus noise ratio (SINR);
wherein in a case where the report configuration comprises a feedback using the RSRP and a beam grouping criterion, the channel state information is determined by:
creating N groups and setting an integer parameter i to 0, wherein N is an integer greater than or equal to 1;
determining, from an RSRP set, user antenna panels having top S RSRPs and reference signals having the top S RSRPs, where S is an integer;
determining the reference signals having the top S RSRPs to be an $i^{th}$ reference signal set, denoted as Ki, under an $i^{th}$ group, and determining the user antenna panels having the top S RSRPs to be an $i^{th}$ antenna panel set, denoted as Li;
in a case where the parameter i is less than N−1, removing an element in the RSRP set that is associated with the reference signals having the top S RSRPs and with the user antenna panels having the top S RSRPs to obtain an updated RSRP set; setting i to i+1, and returning to execution of determining, from the RSRP set, the user antenna panels having the top S RSRPs and the reference signals having the top S RSRPs; and
in a case where the parameter i is equal to N−1, outputting the N groups.

14. The method of claim 13, wherein the channel state information further comprises at least one of grouping information, a reference signal receiving power (RSRP), or a signal to interference plus noise ratio (SINR).

15. The method of claim 13, wherein a plurality of report configurations have an association relationship, or a plurality of report instances have an association relationship.

16. The method of claim 15, wherein the association relationship among the plurality of report configurations or the association relationship among the plurality of report instances is determined through at least one of:
radio resource control (RRC) signaling, media access control-control element (MAC-CE) signaling, or downlink control information (DCI) signaling.

17. The method of claim 13, wherein the grouping criterion comprises at least one of: a beam grouping criterion or an antenna grouping criterion.

18. An information feedback apparatus, configured in a first node, comprising:
a first receiving module, which is configured to receive a report configuration sent by a second node;
a determination module, which is configured to determine channel state information according to the report configuration, wherein the channel state information comprises a reference signal, and the reference signal satisfies a grouping criterion associated with the report configuration; and a feedback module, which is configured to feed back the channel state information to the second node through a report instance;

wherein the channel state information further comprises at least one of grouping information, a reference signal receiving power (RSRP), or a signal to interference plus noise ratio (SINR);

wherein in a case where the report configuration comprises a feedback using the RSRP and a beam grouping criterion, the determination module performs the determining by:

creating N groups and setting an integer parameter i to 0, wherein N is an integer greater than or equal to 1;

determining, from an RSRP set, user antenna panels having top S RSRPs and reference signals having the top S RSRPs, where S is an integer;

determining the reference signals having the top S RSRPs to be an $i^{th}$ reference signal set, denoted as Ki, under an $i^{th}$ group, and determining the user antenna panels having the top S RSRPs to be an $i^{th}$ antenna panel set, denoted as Li;

in a case where the parameter i is less than N−1, removing an element in the RSRP set that is associated with the reference signals having the top S RSRPs and with the user antenna panels having the top S RSRPs to obtain an updated RSRP set; setting i to i+1, and returning to execution of determining, from the RSRP set, the user antenna panels having the top S RSRPs and the reference signals having the top S RSRPs; and in a case where the parameter i is equal to N−1, outputting the N groups.

19. An information receiving apparatus, configured in a second node, comprising:

a configuration module, which is configured to configure a report configuration;

a sending module, which is configured to send the report configuration to a first node such that the first node determines channel state information according to the report configuration, wherein the channel state information comprises a reference signal, and the reference signal satisfies a grouping criterion associated with the report configuration; and a second receiving module, which is configured to receive the channel state information fed back by the first node through a report instance;

wherein the channel state information further comprises at least one of grouping information, a reference signal receiving power (RSRP), or a signal to interference plus noise ratio (SINR);

wherein in a case where the report configuration comprises a feedback using the RSRP and a beam grouping criterion, the channel state information is determined by:

creating N groups and setting an integer parameter i to 0, wherein N is an integer greater than or equal to 1;

determining, from an RSRP set, user antenna panels having top S RSRPs and reference signals having the top S RSRPs, where S is an integer;

determining the reference signals having the top S RSRPs to be an $i^{th}$ reference signal set, denoted as Ki, under an $i^{th}$ group, and determining the user antenna panels having the top S RSRPs to be an $i^{th}$ antenna panel set, denoted as Li;

in a case where the parameter i is less than N−1, removing an element in the RSRP set that is associated with the reference signals having the top S RSRPs and with the user antenna panels having the top S RSRPs to obtain an updated RSRP set; setting i to i+1, and returning to execution of determining, from the RSRP set, the user antenna panels having the top S RSRPs and the reference signals having the top S RSRPs; and in a case where the parameter i is equal to N−1, outputting the N groups.

* * * * *